Nov. 2, 1943.
H. T. KUCERA
2,333,319
CONTROL APPARATUS
Filed Feb. 2, 1942
13 Sheets-Sheet 2
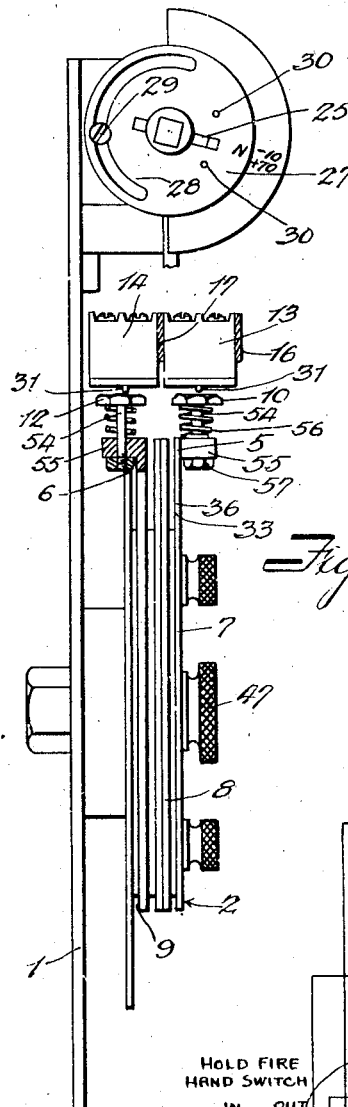
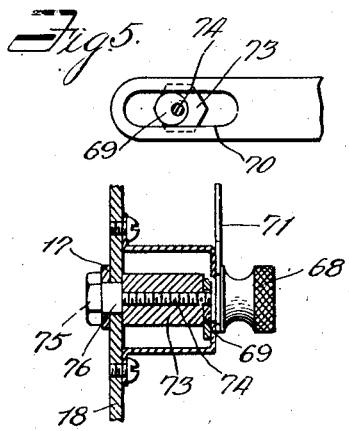
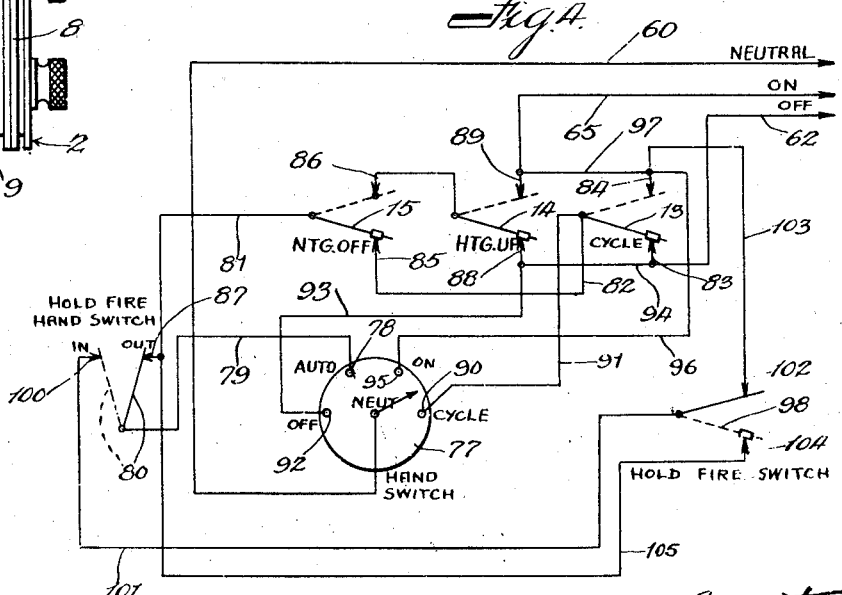

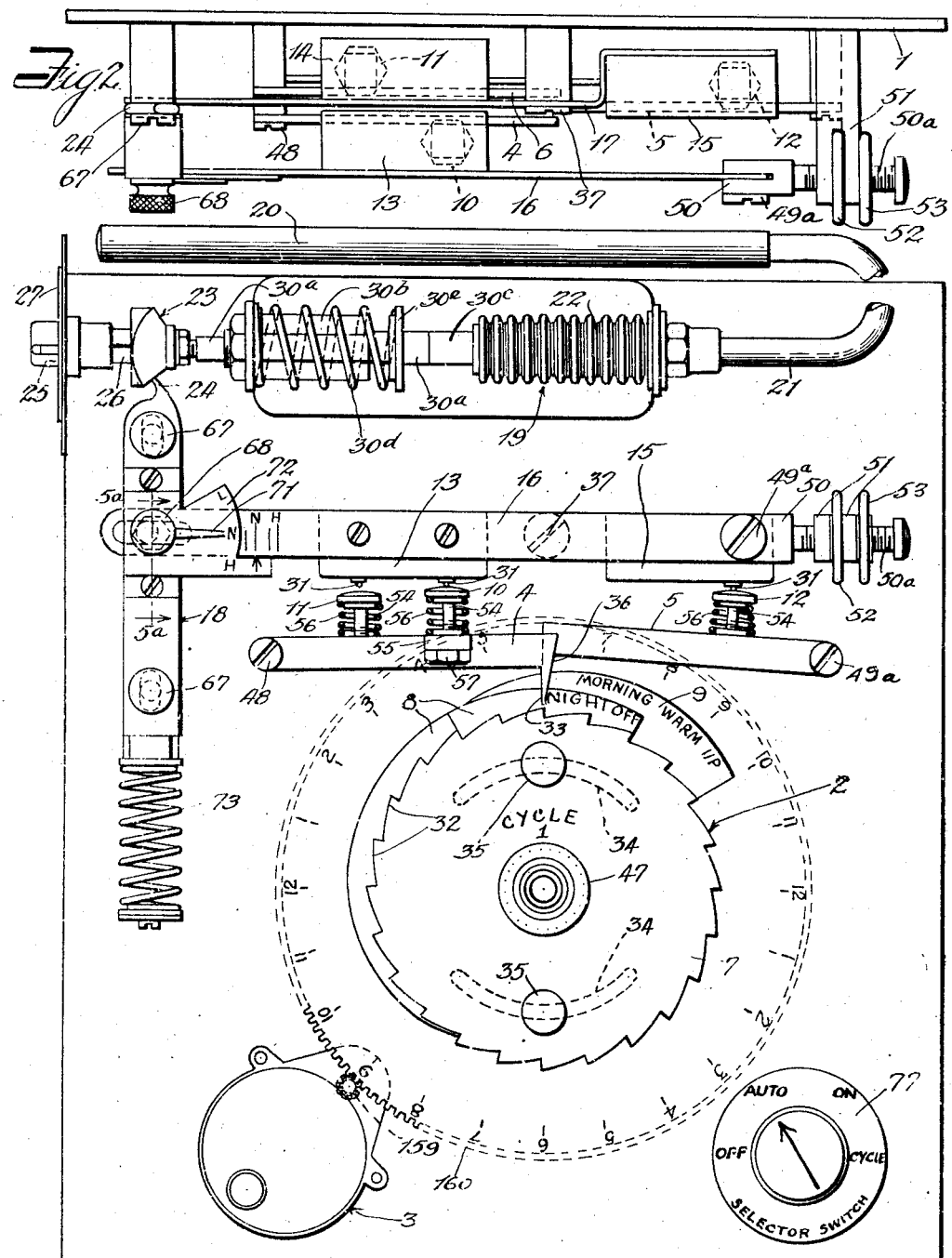

Nov. 2, 1943.        H. T. KUCERA        2,333,319
CONTROL APPARATUS
Filed Feb. 2, 1942        13 Sheets-Sheet 3
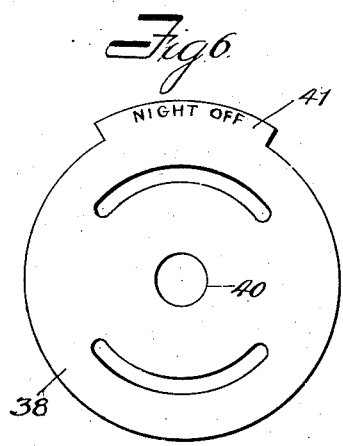
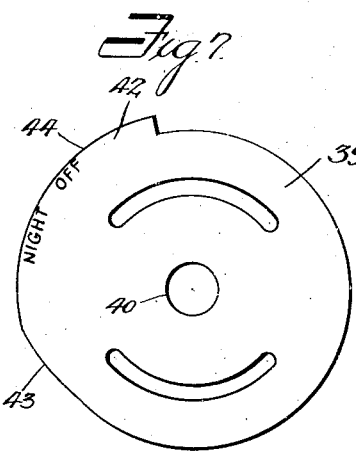
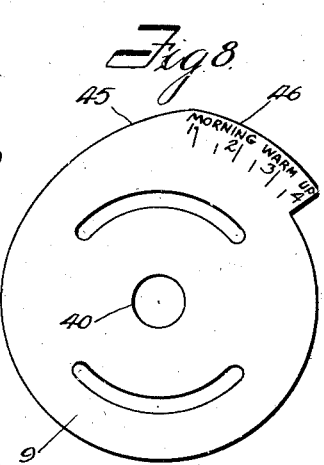
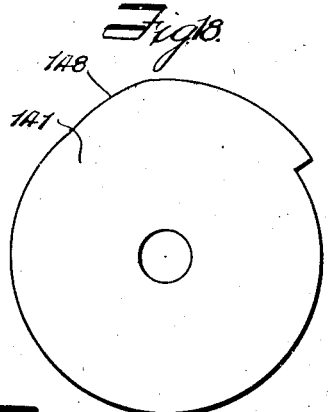
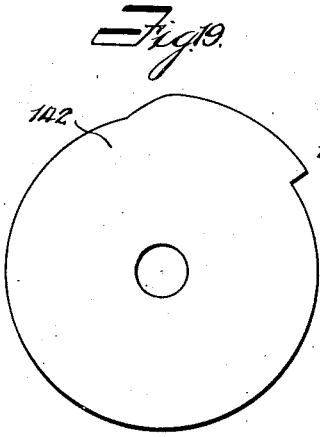
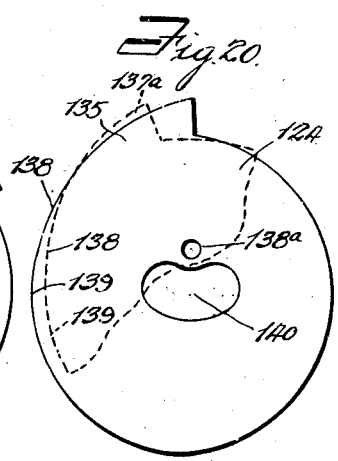
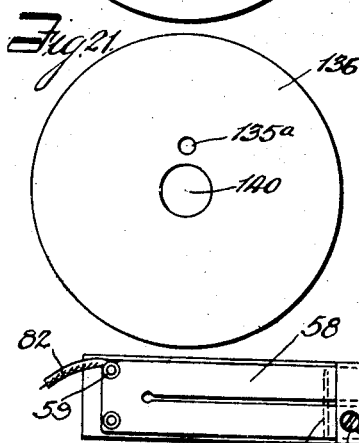
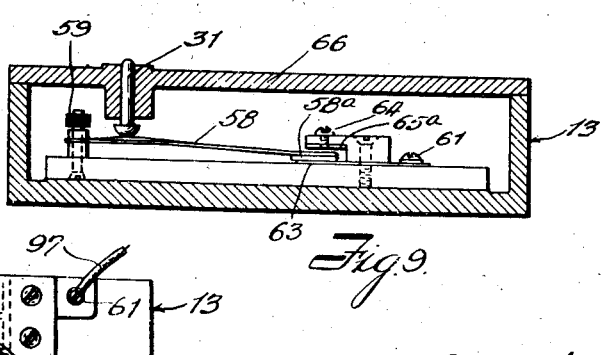
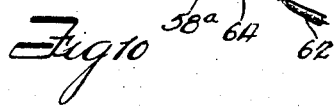
Inventor
Henry T. Kucera
By Thiess, Olsen & Mecklenburger
Attys

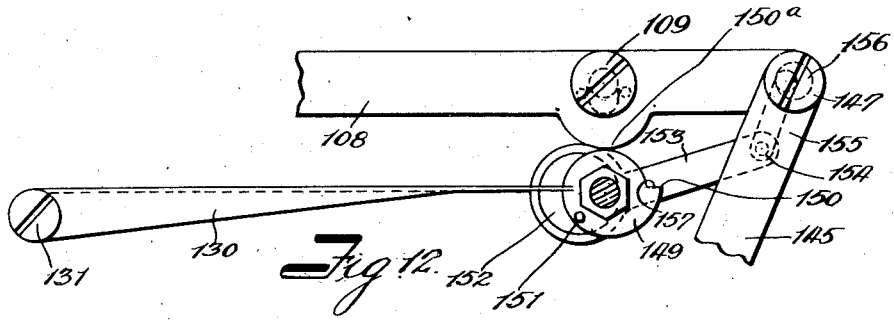
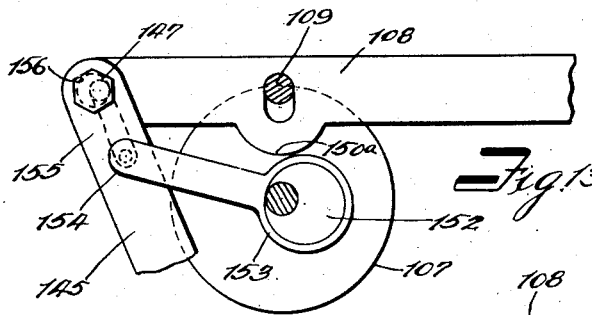
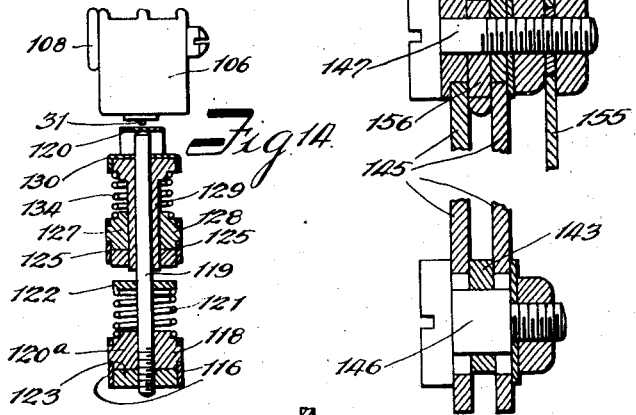
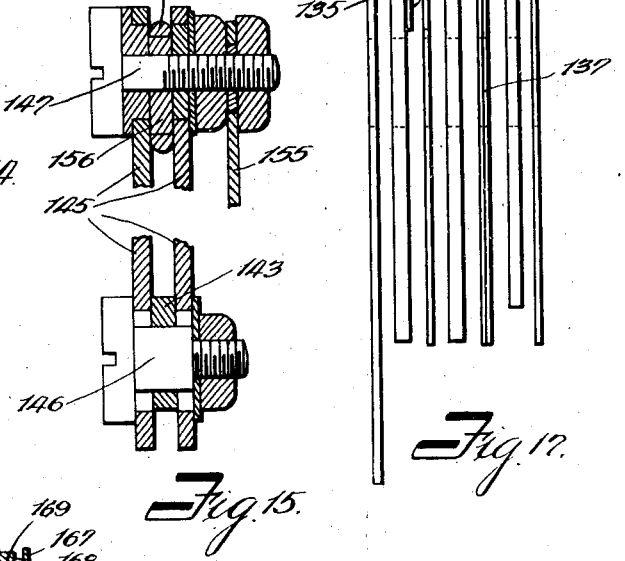
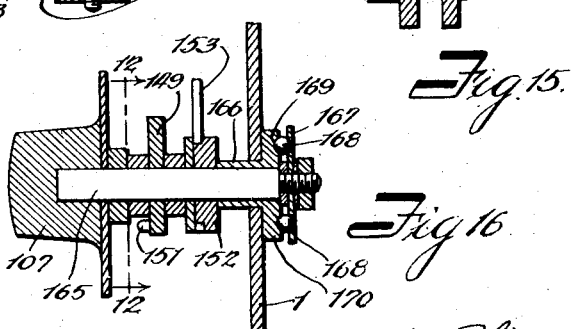

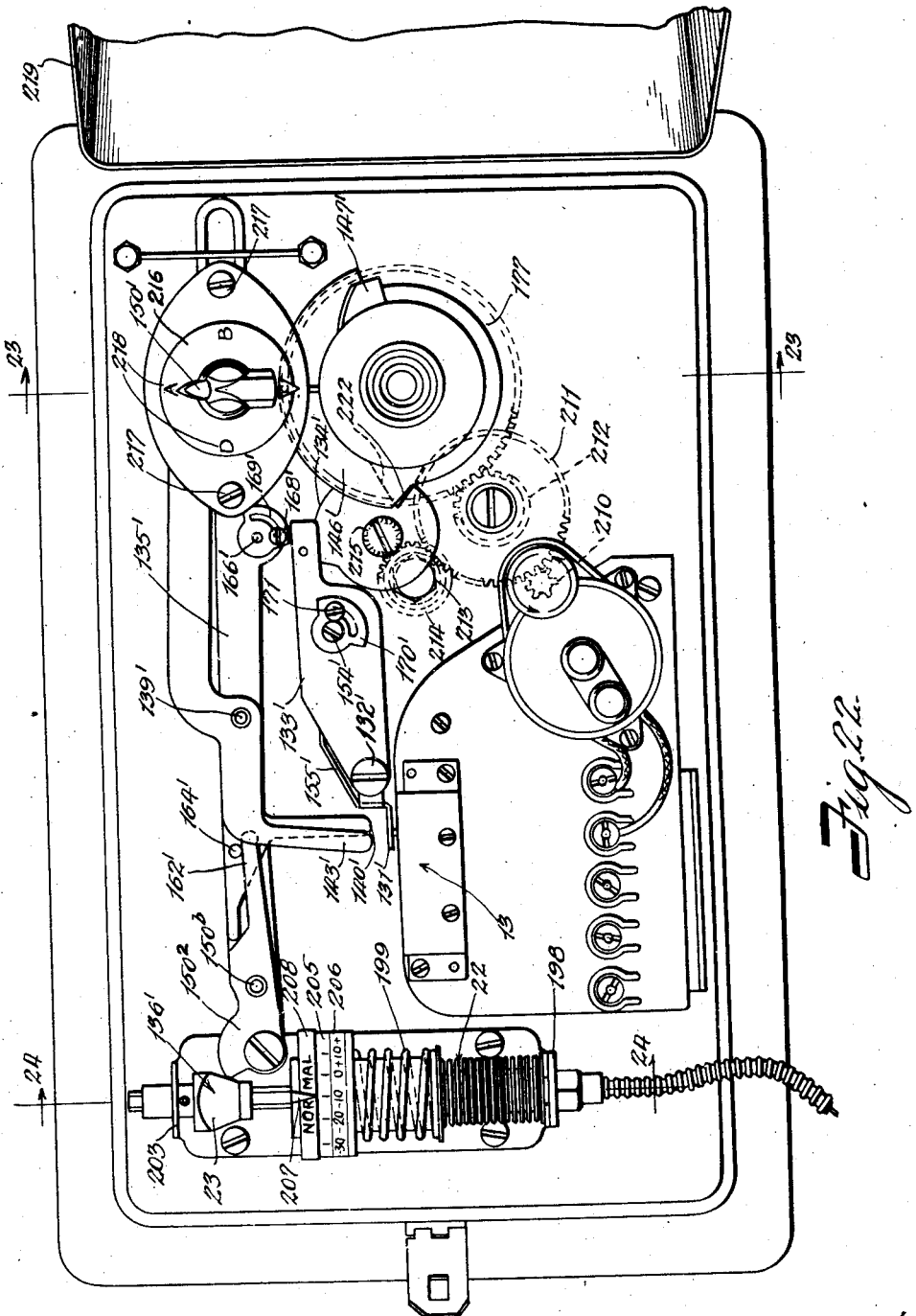

Nov. 2, 1943.       H. T. KUCERA       2,333,319
CONTROL APPARATUS
Filed Feb. 2, 1942      13 Sheets-Sheet 7

Inventor:
Henry T. Kucera.
By Thiis, Olson + Mecklenburgn.
Attys.

Nov. 2, 1943.  H. T. KUCERA  2,333,319
CONTROL APPARATUS
Filed Feb. 2, 1942  13 Sheets-Sheet 9

Inventor:
Henry T. Kucera
By Thiess, Olson & Mecklenburger
Attys.

Nov. 2, 1943.    H. T. KUCERA    2,333,319
CONTROL APPARATUS
Filed Feb. 2, 1942    13 Sheets-Sheet 13

Inventor:
Henry T. Kucera.
By Thiess, Olson & Mecklenburger
Attys.

Patented Nov. 2, 1943

2,333,319

UNITED STATES PATENT OFFICE 2,333,319

CONTROL APPARATUS

Henry T. Kucera, La Grange, Ill.

Application February 2, 1942, Serial No. 429,261

40 Claims. (Cl. 200—139)

My invention relates to control apparatus controlled by time and temperature.

One of the objects of my invention is to provide circuit controlling apparatus controlled both by time and temperature suitable for controlling the usual voltage and amperage found in practice.

A further object of my invention is to provide such an apparatus which avoids the use of transformers and exposed conducting surfaces.

A further object of my invention is to provide a heat transfer controlling apparatus in which the flow of heat is controlled by a snap-action switch having an extremely short motion of its actuating member, the switch being controlled by a rotary time-controlled cam having a relatively large rise and drop.

A further object is to provide a heat transfer controlling device controlled by outside temperature for effecting a controlled transfer of heat during a certain daily period, a different supply of heat during another period, a different supply of heat during still another period, using a single snap-action switch having a relatively small stroke controlled by a time-controlled rotary cam having a relatively large rise and drop and involving the use of a selective cam follower cooperating with a time-controlled compound cam mechanism, the selective follower being adjustable to bring different follower elements into cooperative relation to the various parts of the compound cam to enable a number of different conditions of operation of the heat transfer apparatus to be obtained.

Further objects and advantages of the invention will be apparent from the description and claims.

The apparatus may be used, for example, for controlling the thermal requirements of a building by the conjoint use of chronometric means and thermostatic means controlled by temperature outside the space with respect to which heat transfer is to be made. The apparatus may be used either for heating systems or for cooling systems.

In the drawings in which two embodiments of my invention are shown,

Figure 1 is a front elevation of control apparatus embodying my invention;

Fig. 2 is a plan view of the apparatus of Fig. 1;

Fig. 3 is an end elevation from the left-hand side of Fig. 1;

Fig. 4 is a wiring diagram for the apparatus;

Fig. 5 is a detail view of an adjustable lever connection;

Fig. 5a is a section on the line 5a—5a of Fig. 1;

Fig. 6 is a detail view of one of the cams;

Fig. 7 is a detail view of another of the cams;

Fig. 8 is a detail view of another of the cams;

Fig. 9 is a part sectional, part elevational view of one of the switches;

Fig. 10 is a plan view of the switch;

Fig. 12 is a detail, sectional view on the line 12—12 of Fig. 16, showing a selector knob and associated parts;

Fig. 13 is a part sectional, part elevational view of parts shown in Fig. 12;

Fig. 14 is a section substantially on the line 14—14 of Fig. 11;

Fig. 15 is a section substantially on the line 15—15 of Fig. 11;

Fig. 16 is a section on the line 16—16 of Fig. 11;

Fig. 17 is a diagrammatic edge view of the cams and associated parts;

Fig. 18 is a face view of one of the cams;

Fig. 19 is a face view of another of the cams;

Fig. 20 is a face view of another of the cams;

Fig. 21 is a face view of one of the spacer discs;

Fig. 22 is a front elevation showing another form of my invention;

Figure 11:
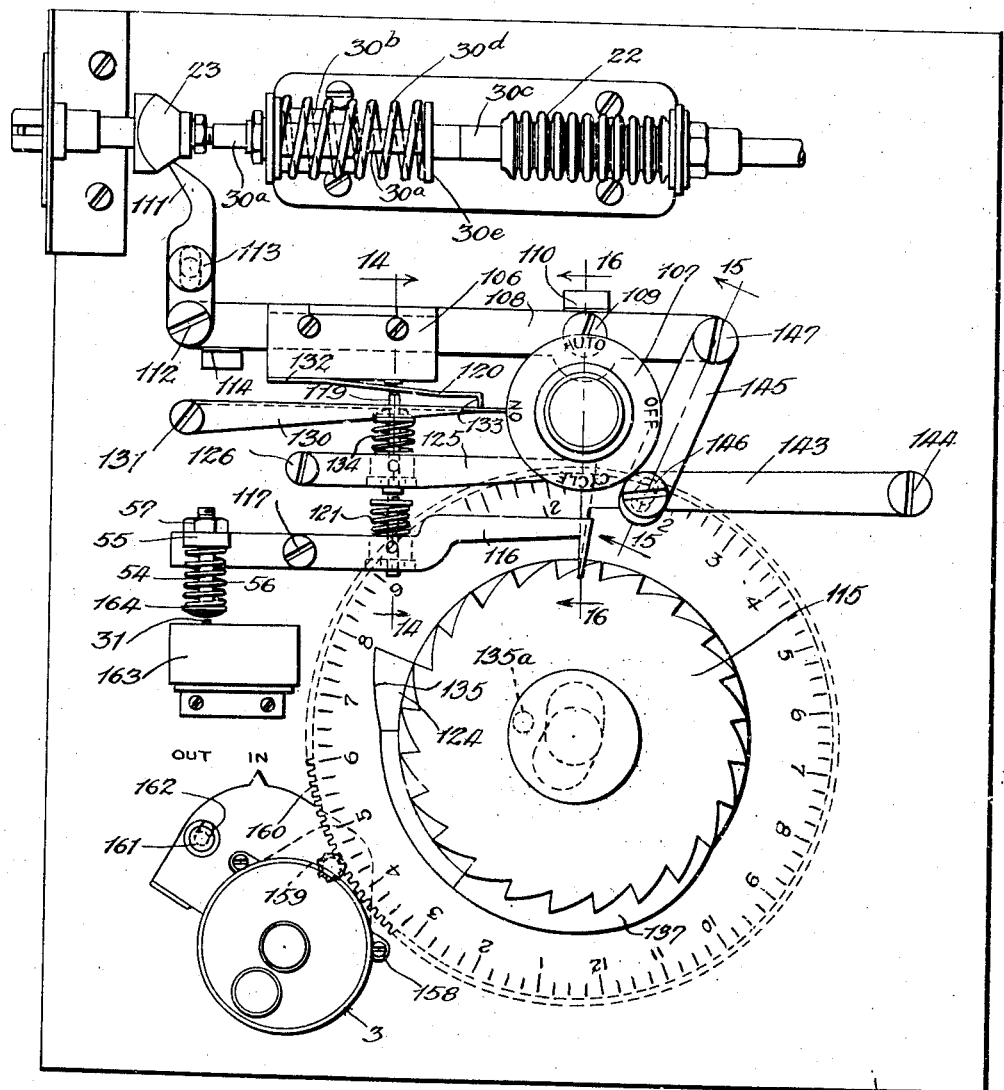
Fig. 11 is a front elevational view showing another form of my invention.

Figs. 31-35, incl., are face views, showing, respectively, various parts of the compound cam;

Fig. 36 is a plan view of a gear drive member; and

Fig. 37 is a face view of one of the cam members.

Referring to the drawings in detail, and first to Figs. 1-10, incl., the construction shown comprises a mounting panel 1 which may be set in vertical position, a compound chronometric rotary cam 2 for controlling certain circuits, a synchronous motor 3 for driving this compound cam, a plurality of follower levers 4, 5, and 6, one cooperating with each of the three cam elements 7, 8, and 9 of the compound cam 2, a plurality of yielding switch actuating members 10, 11, and 12, one mounted on each of the follower levers, a plurality of snap switches 13, 14, and 15, one operable by each of the switch actuating members, a switch-carrying lever 16 on which the switch 13 is mounted, a switch-carrying lever 17 on which both of the switches 14 and 15 are mounted, a slide 18 for controlling the position of both of the switch-carrying levers, and thermostatic means 19 for controlling the position of the lever-controlling slide.

The thermostatic device may be similar to that described in my United States Patent No. 2,271,651. It comprises a bulb 20, which may contain a volatile liquid and which may be placed outdoors or in some position where it will not be affected by the temperature within the space with respect to which heat transfer is to be made, connected by a flexible conduit 21 with an expansible bellows-like diaphragm chamber 22 which elongates and contracts in accordance with the amount of volatilization of the liquid in the bulb. The expansion and contraction of the diaphragm bellows 22 causes axial movement of a compound cam 23, the cam surface of which engages a follower 24 on the above-described lever-actuating slide 18. As described in the above application (Serial No. 57,449), this cam 23 is so shaped that different axial sections will give different meridional contours having different degrees of angularity with respect to the axis of the cam. The axial adjustment is effected as described above by means of the expansion and contraction of the diaphragm bellows.

The rotational movement of the cam to bring different meridional contours into cooperation with the follower 24 is effected by means of a rotatable manually operated button 25 coaxial with the cam and having a squared axial recess into which extends a squared shank 26 secured to the cam 23 so that axial movement of the cam 23 relative to the button 25 is possible, but relative rotation between the button and the cam is prevented. The manual rotational adjustment of the cam enables the thermostatic control to be set for different localities or for conditions having different thermal requirements. As set forth in my prior co-pending application Serial No. 57,449, the cam 23 comprises a conoidal portion which can be manually set for various positions of rotative adjustment and which is axially movable under the control of the temperature-controlled bellows. Each different manual rotational adjustment brings into cooperative relation with the cam follower a different meridional contour. These different meridional contours have different degrees of inclination with respect to the axis of the cam. If the radiation and heating equipment installed is ample so that the heating equipment does not have to operate on full time until the temperature is extremely low, the cam will be adjusted to bring a meridional contour having a relatively slight degree of inclination with respect to the axis into cooperative relation with the cam follower. On the other hand, if the radiation and heat supply apparatus is not ample, the cam can be adjusted to bring a relatively steep meridional contour into cooperative relation with the cam follower so that the heat supply will be maintained in on-condition for practically full time operation with a relatively small collapse of the thermostatic bellows.

To enable the thermostat to be set so that the manual button can be operated only within a certain range, a range-fixing disc 27 is provided which can be set to any desired angularly adjusted position by means of the arcuate slot 28 and set screw 29. This disc 27 has limiting stops 30 between which the arm of the cam adjusting button may be operated. For example, if it is desired to set the thermostatic controller for a condition where the outside temperature may vary from —10° to +70°, the range-fixing dial is set so that the letter "N" is opposite the scale indicia "—10 +70." With this adjustment of the range-fixing disc the cam adjusting button may be swung to any desired position between the stop pins 30 to suit local requirements. The cam 23 is secured to a plunger 30a slidable in a fixed sleeve 30b. The end of the plunger 30a is held in engagement with the push pin 30c carried by the bellows diaphragm 22 by means of a coil compression spring 30d bearing on a flange 30e carried by the plunger 30a.

Each of the switches 13, 14, and 15 used is a snap-action switch, including a push pin member 31 which is spring-pressed into extended position and which requires a very slight amount of movement to effect the snap action of the switch. This movement may be as small as .002". The switch is designed to control electric circuits having the usual voltages and amperages found in practice without the use of transformers and relays. As an example of such a switch, reference is made to the disclosure in Patent No. 1,780,758, dated November 4, 1930. The total rise of the gradual rise cam portions of the cycle cam is many times greater than that required to effect the snap action of the switch. For example, the total rise of one of the cam teeth of the cam section 7 may be about ⅛" which is about sixty times the rise necessary to effect the snap action of the switch.

The thermostatic control which determines the position of the slide follower 18 is such that a decrease in the outside temperature will move the slide 18 downwardly and move the switches 13 and 14 closer to the actuating buttons 10 and 11 on the cam controlled levers 4 and 6 and hence will cause the switches 13 and 14 to be operated at an earlier stage in the cam controlled rise of the levers 4 and 6. On the other hand, the design is such that a drop in temperature will cause the switch 15 to move farther away from the switch actuating button 12 on the cam controlled lever 5.

With this construction, and referring particularly first to the operation of the cycle disc 7, the design is such that a drop in temperature will cause each of the gradual rise cam portions or teeth 32 of the cycle disc to effect a longer period of heat supply or heat transfer. The period of heat transfer is the period beginning with the operation of the switch 13 by the spring-pressed push button 10 on the cam operated lever 4 and ending with the dropping off of the downwardly extending follower portion 33 of the lever 4 from the abrupt edge or drop which terminates the gradual rise of the cam portion 32. Similarly, a drop in temperature will advance the time at which the morning heating-up cam 9 will cause operation of the switch 14. A drop in temperature will cause the switch 14 to approach the actuating button 11, and the actuating button 11 will be engaged by the push button 31 on the switch 14 at an earlier stage of movement of the rotatable cam 9 than would be the case with a higher outside temperature. The cam disc 9 may be used, for example, as a morning heating-up cam for turning the heat on in the building in the morning at a time varying with outdoor temperature conditions. For this purpose the leading edge of the cam is designed with a gradual slope. The cam 8 may be used to turn off the heat or turn it down at a time in the evening after which the thermal requirements of a building may be less than that of the preceding period. The night-off cam 8 may be made in two parts or sections so that the night-off period may be shortened or lengthened by angular adjustment of these cam sections about the axis of the cam. Similarly, the morning heating-up cam section 9 may be adjustable to provide manual control for cooperation with the thermostatic control for determining the time of beginning and end of the morning heating-up.

In order to enable these cam sections 8 and 9 to be secured in angularly-adjusted position, they are provided with arcuate slots 34 through which extend clamping screws 35 which may be tightened up to hold the cam sections in adjusted position.

Assuming that the apparatus is installed to control the heating of a building, the apparatus will be set up with the bulb 20 in position to be affected by outside temperature and the wires from the switches will be connected to control heat supply means such, for example, as a steam valve, an oil burner, or a power-driven stoker. The synchronous motor 3 will be connected up to a suitable source of current to drive the compound cam 2. This cam may be so connected that it will be rotated once every 24 hours. The cycle cam 7 may be designed so that each gradual cam rise section or tooth 32 will be engaged by the follower 33 for one hour; that is to say, there may be twenty-four of these cam rises upon the disc 7. The night-off cam sections, for example, may be set so that heat will be turned off in the evening anywhere between seven and ten o'clock, depending on outdoor temperature conditions, and so that the night-off control will be eliminated at some time around five o'clock in the morning. The morning heating-up cam section may be set so that the heat will be turned on and kept on in the morning at some time between six and nine o'clock. The above settings are merely illustrative.

With this construction and design, as the compound cam 2 rotates during the day-on period, the cam teeth or sections 32 will cause an intermittent supply of heat to the region to be heated, the lengths of these periods being controlled by outside temperature. The colder the outside weather, the closer will the switch 13 be to the actuating button 10, and hence the longer will be the period of heat supply. During the day-on period, this cycle disc cam will continue to supply shots of heat, the length of each shot being controlled by outside temperature conditions. As night comes on and as the leading edge of the night-off cam 8 approaches and engages the follower portion 36 of the lever 5, the lever 5 will rise and effect the closing of the switch 15 at a time dependent on outside temperature. The lower the outside temperature, the later will be the operation of this heat-off switch, as a drop in temperature will move the switch farther away from the operating button due to the location of the fulcrum 37 of the lever 17 on which the switch 15 is mounted. Thus the cooler the outside air the longer will the heat be held on in the evening. The night heat-off switch remains effective either until the cam follower 36 of the lever 5 drops off from the abrupt edge of the night-off cam or until the morning heating-up cam 9 comes into operation to raise the button 11 on the follower lever 6. When the advance edge of the morning heating-up cam section 9 engages this follower lever 6, the switch-actuator button 11 will engage the push pin 31 on the switch 14 and operate the switch to maintain the heat on until the cam follower lever 6 drops off from the abrupt rear edge of the morning heating-up cam 9.

The cam element 8 for controlling the night-off operation comprises two discs 38 and 39 shown in Figs. 6 and 7, respectively. These discs are angularly adjustable about a central stud which extends through the central openings 40 in the discs. The raised edge portions 41 and 42 of the cams overlap and by angular adjustment of one section or the other the beginning and ending of the night-off operation may be controlled. The cam portion 42 comprises a gradual rise portion 43 and a uniform height sustaining portion 44 equal in height to that of the cam portion 41. The morning heating-up controlled cam 9 shown in Fig. 8 has a raised edge portion beginning with a gradual incline 45 which leads to a uniformly raised portion 46. By angularly adjusting this cam disc 9, the time of beginning and ending of the morning heating-up period may be controlled. After the cams have been moved to the desired adjusted position, they may be clamped together by means of the clamping nut 47.

The cam levers 4 and 6 may be pivotally mounted on the supporting panel by means of a common pivot pin 48. The cam lever 5 is pivotally mounted on the panel board 1 by means of the pivot screw 49. The lever 16 which carries the cycle switch 13 is pivotally mounted on the panel by means of a pivot screw 49a. The pivot screw 49 is carried by a yoke 50 having a screw-threaded extension 50a slidable in apertures in a forked bracket 51 and adjustable longitudinally by means of a thumb nut 52 threaded on the extension 50. A lock nut 53 is threaded on the end of the extension 50 to hold it in adjusted position.

The switch-carrying lever 17 which carries the morning heating-up switch 14 and the night-off switch 15 is mounted on a central pivot pin 37 as previously described.

Each of the yielding switch-actuating push buttons 10, 11, and 12 comprises a button for engaging the push pin of the corresponding switch, a plunger pin 54 on which this button is slidably mounted in a lug 55 on one of the cam levers, a coil compression spring 56 surrounding this plunger and bearing on the push button, and a nut 57 threaded on the lower end of the plunger and engaging the lug 55 to limit the distance to which the spring 56 can raise the push button. As previously stated, the switches 13, 14, and 15 may be of the type described in Patent No. 1,780,758. This patent, however, described simply a make-and-break contact whereas for the circuit described hereafter a two-way switch is required which will connect a neutral wire with an on-wire in one position and with an off-wire in another position. For this purpose a switch, such as shown in Figs. 9 and 10, may be employed. As here snown, the switch comprises the bifurcated, warped, spring, sheet metal, snap switch member 58 similar to the member 5 shown in the above patent, the bifurcations of the member 58 being drawn toward each other slightly and united by the contact member 58a, a binding terminal 59 connected with this snap contact to which the neutral wire 60 may be electrically connected, a binding terminal 61 to which the off-wire 62 may be connected electrically, the binding terminal 61 being electrically connected with a contact 63 engageable with the snap-switch member 58a, and a binding terminal 64 to which the on-wire 65 may be connected, the terminal 64 being electrically connected with the other contact 65a of the switch. The push pin 31 may be slidably mounted in an opening in the cover 66 for the switch and moved to operate the switch by the push button 10 on the switch-operating member.

The slide 18 which carries the cam follower 24 is slidably mounted on guide pins 67 which extend through slots in the slide and are mounted on the base panel 1. The end of the switch-carrying lever 16 which carries the cycle switch 13 may be adjusted up or down with respect to the slide 18 by means of a rotatable thumb button 68 (Figs. 1, 2, and 5ᵃ) mounted on the slide 18 and carrying an eccentric crank 69 operating in a slot 70 in the end of the lever 16. This rotatable thumb button is provided with an index or pointer 71 cooperating with a scale 72 carried by the slide 18 provided with indicia indicating "normal," "low" and "high." When the pointer is set to "high," the end of the switch-carrying lever 16 is lowered with respect to the slide 18 so that the heat-on periods will be relatively longer and, on the other hand, when the pointer is moved toward the index "low," the end of the lever 16 and the switch 13 carried thereby will be raised with respect to the thermostat controlled slide 18 so that the heat periods will be relatively shorter. A coil comression spring 73 is provided bearing upwardly on the lower end of the slide 18 for holding the cam follower 24 in engagement with the cam 23.

The eccentric 69 is clamped between a shoulder on the thumb button 68 and a spacing nut 73 into which the shank 74 of the button 68 is threaded. The end of the shank 74 is threaded into a nut 75 having a collar portion 76 fitting in an opening in the slide 18. The lever 17 has an opening through which the collar 76 extends so that movement of the slide 18 causes the lever 17 to rock on the pivot 37.

A coil compression spring surrounds the fixed bushing in which the plunger carrying the cam 23 is mounted, this spring bearing on a flange secured to the plunger and serving to hold the plunger against the plunger on the expansible diaphragm 22. The chronometric motor 3 which drives the compound cam 2 has a small drive pinion which meshes with a large gear secured to and concentric with the compound rotary cam 2.

A circuit which may be used in connection with the control switches 13, 14, and 15 is shown in Fig. 4. The wires 62 and 65 may be connected with heat transfer control apparatus in such a way that when the neutral wire 60 is connected with wire 65 the heat transfer will be relatively large, and when the wire 60 is connected with the wire 62 the heat transfer will be relatively small. As here shown, when the neutral wire 60 is connected by means of the hand switch 77 with the automatic contact 78 and the contact of the cycling switch 13 is in its lowermost position, a circuit is completed from the neutral wire 60 to the off-wire 62, through hand switch 77, the automatic contact 78, conductor 79, hold-fire hand switch 80, conductor 81, night-off switch 15, conductor 82, cycle switch 13, and contact 83. When the cycle cam 7 raises the cycle contact 13 into engagement with the contact 84, a circuit is completed from the neutral line 60 to the on-line 65, through the hand switch 77, contact 78, conductor 79, hold-fire hand switch 80, conductor 81, night-off switch 15, contact 85, conductor 82, cycle switch 13, and contact 84. When the night-off cam 8 raises the night-off switch contact 15 out of engagement with the contact 85 into engagement with the contact 86, the circuit to the cycle switch 15 is broken and a circuit is established between the neutral line 60 and off-line 62 through the hand switch 77, contact 78, conductor 79, hold-fire hand switch 80, contact 87, conductor 81, night-off switch contact 15, contact 86, morning heating-up switch 14, and contact 88 to the off-line 62. It will be seen that if during this night-off period the morning heating-up cam 9 raises the contact 14 of the morning heating-up switch into engagement with the contact 89, the neutral line 60 will be connected with the on-line 65 to start the heat transfer. Also, with this construction, it will be noted that the termination of the morning heating-up period may be determined by the dropping off of the night-off contact 15 from the contact 86 to the contact 85.

If the hand switch 77 is set to connect the neutral wire with the cycle contact 90, the night-off switch 15 and morning heating-up switch 14 will be short-circuited and the cycle switch 13 will be in complete control through the conductor 91. If the hand switch is set to connect the neutral wire 60 with the off-contact 92, all three of the switches 13, 14, and 15 will be short-circuited by the conductors 93 and 94 and the heat will be turned off permanently. If the hand switch 77 is set to connect the neutral wire with the on-contact 95, the switches 13, 14, and 15 will be short-circuited and the neutral wire 60 will be connected with the on-wire 65 through the conductors 96 and 97.

If desired, a cam-controlled, periodically operated, hold-fire switch 98 may be utilized, which will cause an intermittent turning on of the heat to keep the fire from going out. To place the cam-controlled hold-fire switch 98 in operative condition, the manual hold-fire switch 80 is shifted from out- to in-position. Under these conditions, the neutral wire 60 is connected to the switch 98 through the hand switch 80, contact 100 and wire 101, and the automatic hold-fire switch will cause intermittent firing regardless of the operation of the switches 13, 14, and 15, by intermittently engaging the contact 102 which is connected with the on-wire 65 through the conductors 103 and 97. When the switch 98 engages the contact 104, the switches 13, 14, and 15 are again rendered operative through the conductors 105 and 81.

The construction shown in Figs. 11 to 21, incl., is in general similar to the construction previously described in that a time-controlled rotor in combination with an outside thermostat effects a controlled supply of heat during the day-on period, a lessened supply of heat during the night-off period, and an increased supply of heat during the morning heating-up period. The outside thermostat 20, the expansible diaphragm chamber 22, the cam 23, spring 30d, plunger 30a, and adjusting mechanism 25, 27, etc., may be the same as in the form previously described.

In the form shown in Figs. 11 to 21, incl., however, the control during the day-on period, the night-off period, and the morning heating-up period is effected by means of a single switch 106, similar to the switches 13, 14, and 15, and a rotatable control knob 107 (Figs. 11 and 16) is provided which can be adjusted to different positions so that, in one position, the operation will be fully automatic; in another position, the heat supply will be on continuously; in another position, intermittent shots of heat will be delivered during the entire day, and in another position, the heat will be turned off completely, regardless of the action of the control mechanism. In this form, the switch 106 is mounted on a floating lever 108 (Figs. 11, 12, and 13). One end of this floating lever is guided by a pin 109 extending through a slot in the floating lever, a leaf spring 110 being provided which tends to hold this end of the floating lever in lowered position. The other end of the lever is controlled in its movement by a cam follower 111 engaging the cam 23 of the thermostatic controller, this follower being pivotally connected at 112 to the end of the floating lever 108 and guided in its movement by a pin 113 extending through a slot in the follower. A leaf spring 114 is provided which tends to hold the end of the lever 108 in raised position, thus holding the follower 111 against the cam 23.

The cycle disc cam 115 controls the switch 106 by means of a bifurcated cam follower lever 116 (Figs. 11, 14, and 17), the point of which engages the serrated cam edge of the cycle disc. This lever 116 is pivoted at 117 and has yieldingly and pivotally secured at 118 thereto a yielding push pin 119, the upper end of which engages a leaf spring 120 to press this leaf spring against the push button 31 of the switch 106. The push pin 119 is slidably mounted in a trunnion block 120a pivotally mounted at 118 between the sides of the bifurcated cam lever 116. This push pin 119 is normally held in raised position by means of a coil compression spring 121 bearing at its lower end on the trunnion block 120a and at its upper end on a collar 122 secured to the push pin 119. The height to which the spring can press the push pin is limited by a stop nut 123 screwed onto the end of the push pin and engaging the lower face of the trunnion block 120a.

The morning heating-up disc 124 (Figs. 11, 17, and 20) acts on the push pin 31 of the switch through a transmission including the bifurcated cam follower lever 125, the free end of which straddles and rides on the edge of the morning heating-up disc 124 and which is pivotally mounted at 126, a trunnion block 127 pivotally mounted at 128 between the sides of the bifurcated lever 125, a yielding push sleeve 129 through which the push pin 119 extends, a lever 130 (Figs. 11, 12, and 14) pivotally mounted at 131 and having an opening through which the push pin 119 extends, and the leaf spring actuator 120 previously referred to, one end of which is secured at 132 to the switch 106 and the free end 133 of which is engaged by the swinging end of the lever 130. The push sleeve 129 is normally held in raised position by means of a coil compression spring 134 surrounding the push sleeve and bearing at its upper end on a shoulder on the push sleeve and at its lower end on an annular shoulder on the trunnion block 127.

When the raised portion 135 of the morning heating-up cam raises the cam follower lever 125, this will close the switch 106 to turn the heat on by raising the lever 130 which engages the free end of the leaf spring 120 to press the leaf spring against the push button 31 of the switch. In this morning heating-up period, the time of inauguration will depend upon outdoor temperature conditions which, as indicated above, control the position of the end of the floating switch-carrying lever 108 to determine its position with respect to the actuating lever. In order to change the times of beginning and ending of the morning heating-up period, the cam 124 is angularly adjustable about an eccentric pin 135a on one of the spacer discs 136 (Figs. 11, 17, and 21) which separate the cams 115, 137, and 124 (Figs. 17 and 21). The eccentric pin 135a fits in an opening 138a in the cam 124. By adjusting the cam 124 about the pin 135, the drop-off point 137a of the cam 124 may be advanced or retracted, as indicated by the fine-line showing of the cam in Fig. 20. Also, as indicated in the fine-line showing, an adjustment which advances the termination of the morning heating-up period will retard the beginning of the period, and vice-versa, since a swinging movement of the cam 124 about the eccentric pin 135 will cause that advance portion of the gradual cam rise between points 138 and 139 to move toward or away from the center 140 about which the cam rotates.

For the night-off operation, the switch 106 is lifted high enough so that it will not be acted on either by the push pin 119 of the cycle disc 115 or by the push sleeve 129 of the morning heating-up disc 124. This lifting of the switch to render it inoperative is accomplished by the night-off cam discs 141 and 142. The transmission from these cam sectors to the switch-carrying lever includes the cam follower lever 143, the point of which rides on the edges of the night-off cam discs and which is pivotally mounted at 144, and a pair of links 145 (Figs. 11, 12, 13, and 15) having a lost motion pivotal connection with this cam follower lever at 146 and having an adjustable pivotal connection 147 at their upper ends with the floating end of the switch-carrying lever 108.

When the gradual rise portion 148 of the night-off cam disc 141 engages the point of the follower lever 143, it will raise the follower lever and the connecting links 145 and hence will raise the floating end of the switch-carrying lever 108 to raise the switch so high that it will be beyond control of the push pin 119 controlled by the cycle disc 115 and beyond control of the push sleeve and lever 130 which act on the leaf spring 120.

During the day-on period, when neither the night-off lever 143 nor the morning heating-up lever 125 is raised by its corresponding cam, the cycle cam 115 will be in control and will cause intermittent shots of heat, one for each of the teeth of the cycle cam, the duration of these shots being determined by the outside temperature acting through the cam 23 and cam follower 111 to cause raising or lowering of the switch 106 and consequent change in the length of time which the switch will be held in on-position by a cam tooth of the cycle disc 115.

The mechanism (Figs. 12, 13, and 16) controlled by the knob 107, the position of which controls the effect of the cams 115, 137, and 124 on the switch 106, comprises a cam 149 having a high point 150 which in one position engages a projection 150a on the floating lever 108 to raise it above its normal position, a pin 151 mounted on the rotor which in one position of the knob 107 engages the switch-actuating lever 130 and lifts it to a position in which the switch 106 will be in on-condition regardless of the position of the switch-carrying lever 108 and an eccentric 152, which actuates an eccentric strap 153, pivoted at 154 to a lever 155 secured to an eccentric 156 which changes the relative position of the pivotal point of connection between the links 145 and the end of the floating lever 108.

This manually adjustable control knob 107 has four different positions of angular adjustment, approximately 90° apart. These four positions, as indicated above, correspond (1) to a completely automatic operation; (2) to the constant heat-on position; (3) to the pure cycling operation, and (4) to the constant heat-off condition.

In the heat-off condition, the high point 150 of the cam 149 is directly underneath a projection 150a on the floating lever 108 and consequently the floating end of the switch-carrying lever is in its extreme upper position so that the switch is held beyond control both of the push pin 119 controlled by the cycle cam 115 and of the lever 130 controlled by the morning heating-up cam. In the fully automatic position, the high point of the cam is in its right-hand position, as seen in Fig. 12, so that the floating switch-carrying lever 108 may drop down to a position in which the switch 106 may be controlled by the morning heating-up cam 124 and to a position in which the switch will be within control of the push pin 119 controlled by the cycle cam disc 115.

In the on-position of the control knob 107, the pin 151 is moved to a position in which it engages and lifts the lever 130, causing the lever 130 to engage the end of the leaf spring 120 and hold the switch in on-position constantly. This effect may be desirable in cases where the heat has been off for a considerable period and it is desired to supply heat constantly until the temperature is brought up to normal. In this condition the position of the free end of the floating lever 108 is determined by the engagement of the projection 150 on the lever with the circular part of the cam 149.

In the cycling position of the knob 107, the cam 149 is set to a position in which the shoulder or abutment 157 engages the end of the lever 130, thus preventing it from being lifted by the spring push sleeve 129 on the cam lever 125 and thus preventing the morning heating-up lever from being effective to supply heat during the morning heating-up period. Also, in this condition the eccentric 152 is moved to a position which will act on the lever 155 through the eccentric strap 153 to swing the eccentric 156 to raise the links 145 with respect to the levers 108 and 143 to a position such that the night-off cam 137 will not be effective to raise the switch 106 to a position in which it will be out of control of the cycle disc cam.

The time-controlled motor 3 which rotates the cam discs 115, 137, and 124 is provided with a drive pinion 159 which meshes with a large gear 160 which rotates with the cam discs. In order to disconnect the motor from driving relation, it is pivotally mounted on the panel 1 by means of a screw 158. In order to hold the pinion 159 in mesh, a setscrew 161 is provided which extends through a slot 162 in the base of the motor 3. In order to disconnect the pinion 159 from driving relation with respect to the gear 160, the setscrew 161 is loosened and the motor is swung about the pivot 158 to unmesh the gears. This enables the entire set of cam discs to be rotated to any desired position to secure the proper time setting.

It will be seen that in this form the wiring shown diagrammatically in Fig. 4 is substantially eliminated In this form the neutral wire is connected to the binding screw 59, the off-wire is connected to the binding screw 61, and the on-wire is connected to the binding screw 64. When the contact 58a is in engagement with the contact 63, the heat is off and, when the contact 58a is in engagement with the contact 65a, the heat is on.

The hold-fire switch 163 as shown in Fig. 11 may be mounted on the panel 1. It may be similar in construction to the switch shown in Figs. 9 and 10. It may be operated by means of a yielding push button 164 similar to the push buttons 10, 11, and 12 of Fig. 1. This push button may be mounted on an extension of the lever 116. The switch may be so mounted that the hold-fire switch will be operated for a relatively short period at the end of each hourly period controlled by one of the teeth on the cam 115. The length of this relatively short period may be adjusted by tightening up or loosening the nut 57 on the plunger pin 54.

Referring to Fig. 16, the knob 107 may be mounted on a pin or shaft 165 which is rotatably mounted in a bushing 166 on the panel 1. The knob 107 may be held in any of its three adjusted positions by means of a spring washer 167 mounted on the shaft 165, which spring washer presses on the retaining balls 168 which are snapped into pockets 169 in the flange 170 of the bushing 166 to hold the knob 107 in the position to which it is set.

The construction shown in Figs. 22–38, incl., is in general similar to the construction previously described in connection with Figs. 11–12, incl., in that a time-controlled rotor, in combination with an outside thermostat, effects a controlled supply of heat during the day-on period, a lessened supply of heat during the night-off period, and an increased supply of heat during the morning heating-up period, and in that a selective adjustable cam follower is provided for cooperation with a time-controlled rotary compound cam to effect different conditions of heat transfer. The outside thermostat 20, expansible diaphragm chamber 22, and switch 13 may be the same as in the forms previously described. The construction of Figs. 22–38, incl., differs from that shown in Figs. 11–21, incl., in that in Figs. 22–38, incl., the switch is mounted in stationary position. In this construction it may be assumed that the circuits leading to the heat transfer apparatus are such that when the control switch is in on-position, heat transfer will be effected and when the switch is in off-position heat transfer will not be effected.

*Controls for switch*

The control means for the on- and off-switch 13 comprises a switch actuating lever 1311 pivotally mounted at 1321, a hold-fire lever 1331 also pivotally mounted at 1321, a time-controlled cycle and hold-fire cam 1341 for operating the hold-fire lever 1331, a floatably mounted control bar 1351, thermostatic means 1361 for controlling the position of one end of the control bar 1351, time-controlled compound cam program means 1371 for controlling the position of the other end of the control bar 1351, a cycling lever 1381 pivotally mounted on the control bar 1351 at 1391, one end 1401 of which is engageable with the lever 1311 to operate the switch 13 and the other end 1411 of which is lifted periodically (for example, every seventy-two minutes) by the cycling cam 1341 and lever 1331 to close the switch, and a morning heating-up lever 1421 also pivotally mounted on the control bar at 1391, one end 1431 of which is engageable with the switch actuating lever 1311 to close the switch and the other end 1441 of which may be lifted periodically (for example, once every twenty-four hours) by the morning heating-up cam track to close the switch and hold it closed during the morning heating-up period. The compound cam 1371 has in general three cam tracks 1451, 1461, and 1471 (Fig. 23), and the four-position selective cam follower 1481 rotatably mounted on the control bar at 1491 has in general four selective cam follower positions for cooperation in various combinations with the three cam tracks.

Selective cam follower construction and operation

The four-position selective cam follower member 1481 may be rotated to any of the four selected positions, substantially 90° apart, by means of a control knob 1501. When the selective cam follower 1481 is set to the position shown in Figs. 25 and 26 to effect what may be termed the "normal" control, the normal functions are as follows:

1. In the morning, the apparatus automatically varies the time of starting the heating system in accordance with changes in the outside temperature, so that the building always reaches the desired temperature at the required time with no overheating or waste of fuel.

2. After the building has reached the desired daytime temperature, the apparatus maintains this temperature by alternately starting up and shutting down the heating system, the length of each operating period being automatically determined by the outside temperature.

3. In the evening, the apparatus automatically varies the time of shutting down the heating system again in accordance with outside temperature conditions.

4. Whenever the outside temperature rises above 65 degrees, the control automatically cuts off all heating.

5. In a system where "refueling" is required, the built-in adjustable, hold-fire lever 1331 provides "hold-fire" operation once every 72 minutes when no operation would otherwise be produced.

6. The apparatus contains adjustments which can compensate for many characteristics of the heating plant such as:

(a) Heating systems designed for any climate, from mild to frigid.

(b) Heating systems containing too little or too much radiation.

(c) Heating systems in which the generation or circulation of heat is slower than it should be.

(d) Desires of building owners for unusual heating hours, temperature conditions, etc.

Where continuous controlled heating (no night shutdowns or morning warm-up) is desired, as in the case of hospitals, etc., or where a continuous uninterrupted flow of heat to a building is desired, as for test purposes, or where heating is to be entirely discontinued so repairs may be made to the system, etc., the four-way selective cam follower 1481 built into the apparatus permits the following alternative methods of heating system operation:

1. 24-hour cycling controlled by the outside temperature to maintain the desired indoor temperature continuously, night and day.

2. Continuous generation and circulation of heat, limited only by the limit controls (pressurestat, aquastat, etc.).

3. No heat. System entirely shut down except that refueling operation occurs unless "refueler" control is set at "zero" position.

In all of Figs. 25 to 30, incl., showing the position of the control bar 1351, it will be understood that the height of one end of the control bar will be determined by outside temperature which causes the conoidal cam 23 to move up or down to actuate the cam follower lever 1502 to raise or lower the pivotal point 150b of the end of the floating control bar.

Figure 25:
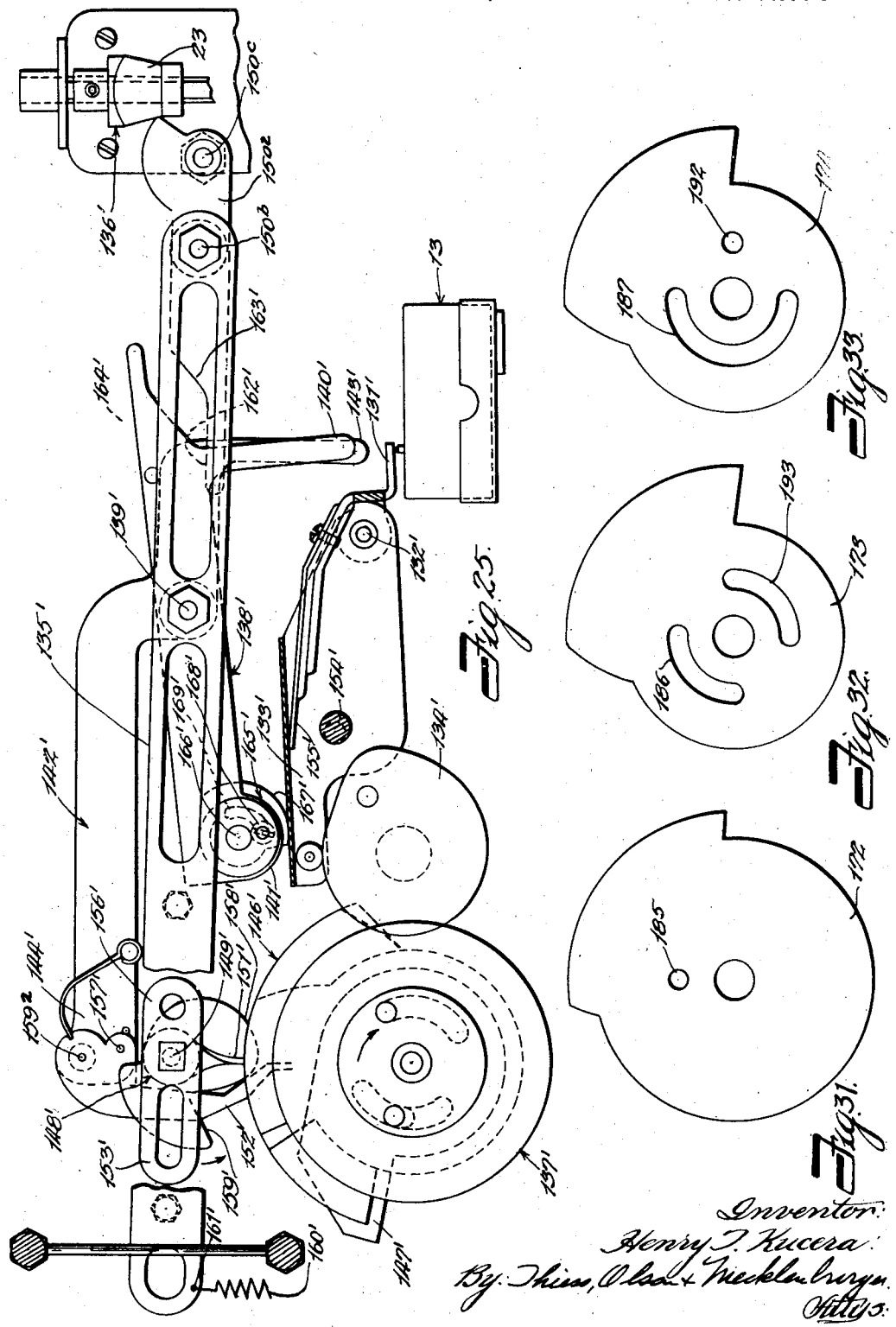
Fig. 25 is a front elevational view on an enlarged scale, showing the control bar, cams and switch in one position.
Figure 26:
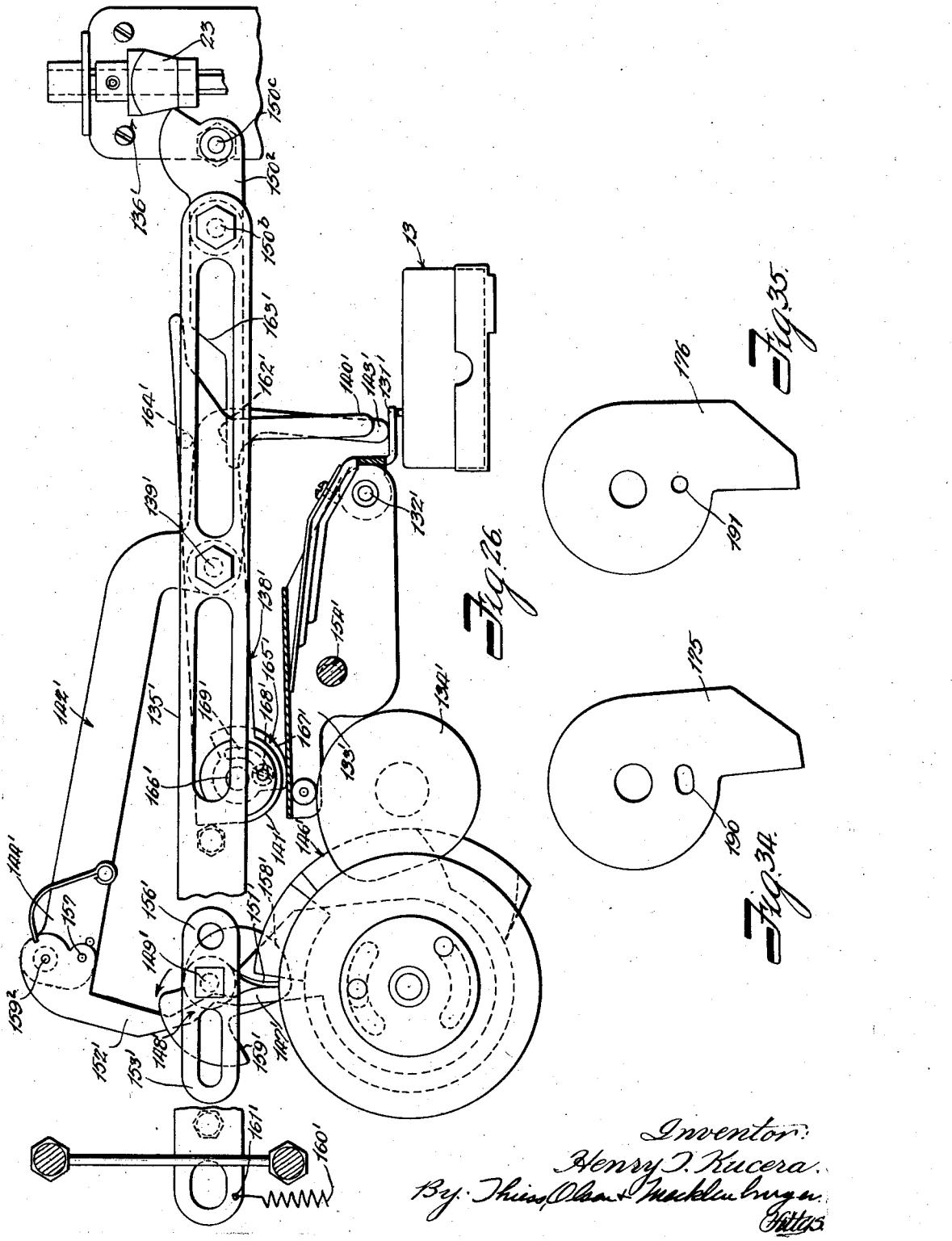
Fig. 26 is a front elevational view similar to Fig. 25, showing the parts in another position.

Figs. 25 and 26 both show the selective cam follower in position to effect movement of operation, but Fig. 26 shows the compound cam itself in a different position from that shown in Fig. 25.

Fig. 26 shows the compound cam in a position in which the day-on, night-off cam follower 1511 rests on the daytime portion of its cam track 1461 and shows the morning heating-up of the cam track 1471 in engagement with the morning heating-up follower 1521.

In both Figs. 25 and 26 the time-controlled cycling cam 1341 is in a position in which the intermediate hold-fire lever 1331 and the cycling lever 1381 are not raised high enough of themselves to cause the operation of the switch, which, however, as shown in Fig. 26, may be moved to on-position by the raising of the left-hand end 1441 of the morning heating-up lever, the tip 1431 of which bears down on the switch-actuating lever 1311 to move the switch 13 to on-position. Both in Figs. 25 and 26, it is obvious that the periodic rotation of the cycling cam 1341 will periodically raise the intermediate hold-fire lever 1331 and the end 1411 of the cycling lever high enough to cause the end 1401 of this lever to bear down on the switch-actuating lever 1311 sufficiently to throw the switch on periodically.

Figure 27:
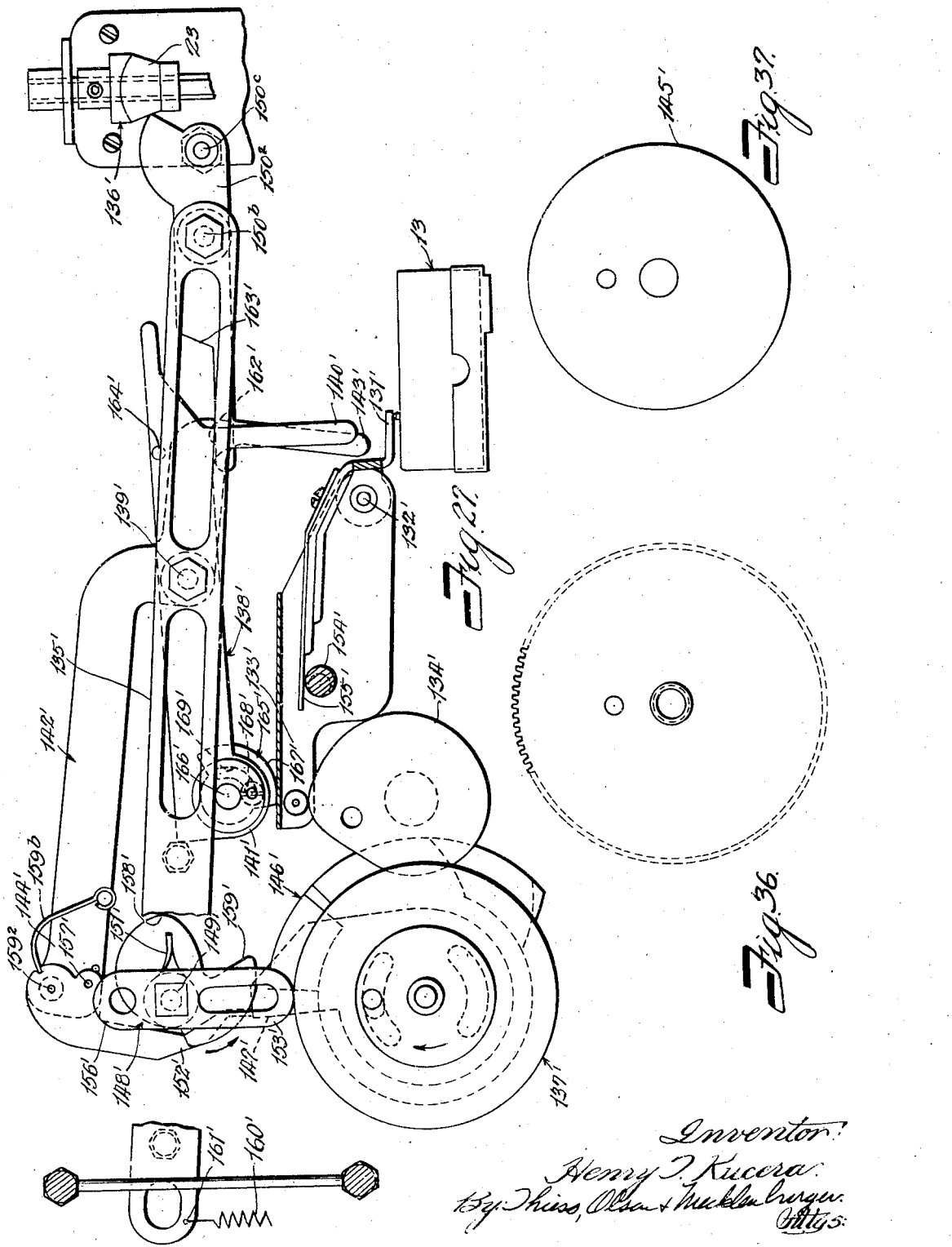
Fig. 27 is an elevational view similar to Fig. 25, showing the parts in another position.

In Fig. 27 the compound selective cam follower 1481 is turned 90 degrees counterclockwise from the position shown in Figs. 25 and 26, to move the cam follower 1511 out of effective position and to move the high-bar cam follower 1531 into effective position resting on the circular constant-level cam track 1451. This will raise the left-hand end of the control bar 1351 so high that neither the cycling lever 1381 nor the morning heating-up lever 1421 will be close enough to the switch-actuating lever 1311 to move the switch 13 to on-position as the compound cam 1371 and cycling cam 1341 rotate.

The refueling lever 1331 will of course still be operative as its operation does not depend on any position of the control bar 1351. In this figure (Fig. 27), the morning heating-up cam 1471 is shown in position to engage the morning heating-up cam follower 1521, but it will be seen that even when raised to its highest point, the morning heating-up lever 1431 does not come in contact with the switch-operating lever 1311. In this position of the selective cam follower 1481, the heat is off continuously except for the periodic on-periods effected by the refueling lever 1331. The length of the on-periods, due to the refueling lever action, can be made as long or short as desired within designed limits by adjusting the eccentric pin 1541 to change the lost motion between the refueling lever and the spring arm 1551 of the switch-actuating lever 1311.

Fig. 27 shows the switch closed by the refueling lever 1331, the eccentric pin 1541 of which is shown in engagement with this yielding leaf spring arm 1551. This yielding leaf spring arm allows the refueling lever 1331 to continue to rise even after the switch-actuating lever 1311 has been moved far enough to close the switch.

Figure 28:
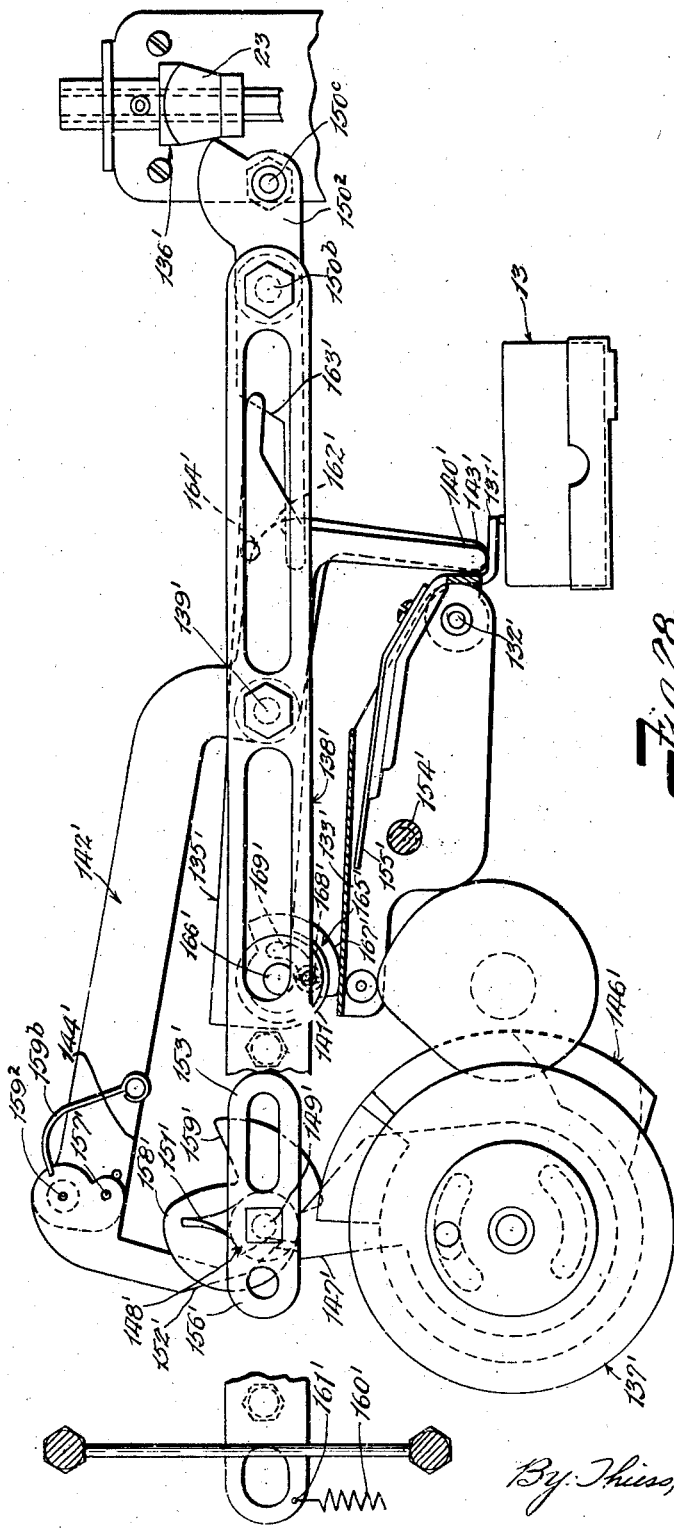
Fig. 28 is a view similar to Fig. 25, showing the apparatus in another position.
Figure 29:
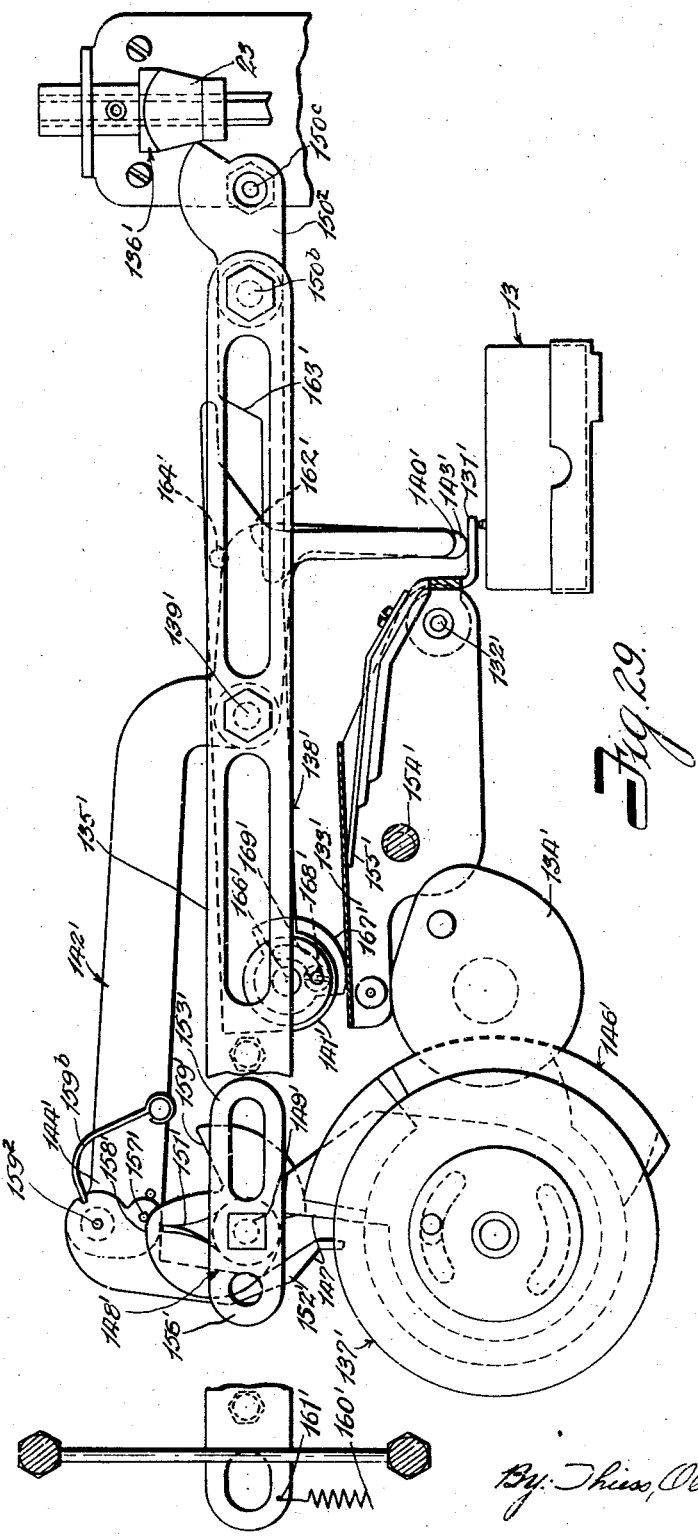
Fig. 29 is a view similar to Fig. 25, showing the parts in another position.

In Figs. 28 and 29 the selective cam follower 1481 is turned 90 degrees counterclockwise from the position shown in Fig. 27, to provide heat continuously. The cam follower portions 1511, 1531, and 1561 are all moved to ineffective position. The morning heating-up follower 1521 is still in position to be engaged by the sector-like morning heating-up cam portion 1471 once during each revolution of the compound cam 1371.

Fig. 28 shows the compound cam in a position such that the morning heating-up cam portion 1471 engages this cam follower 1521. In this position the weight of the control bar 1351 will be carried by the fulcrum pin 1391 of the morning heating-up lever so that downward pressure will be exerted by both ends of this lever. The downward pressure of one end 1441 of the lever will be taken by the cam sector 1471 on which the cam follower 1521 rests, and the downward pressure of the other end 1431 will be taken by the switch-actuating lever 1311 on which the end 1431 of the morning heating-up lever rests so that so long as the morning heating-up cam sector 1471 engages the cam follower 1521, the switch 13 will be held closed to maintain the heat-on period. When the sector-like cam 1471 moves out from under the cam follower 1521 to the position shown in Fig. 29, the control bar 1351 will drop down until the pin 1571 on the pivoted cam follower engages a stop portion 1581 on the compound cam follower. In this position, the weight of the control bar will be carried entirely by the end of the morning heating-up lever 1431 which rests on the switch-actuating lever 1311 so that the switch 13 will still be held in on-position during the complete revolution of the compound program cam 1371. The heat will thus be maintained on continuously.

Figure 30:
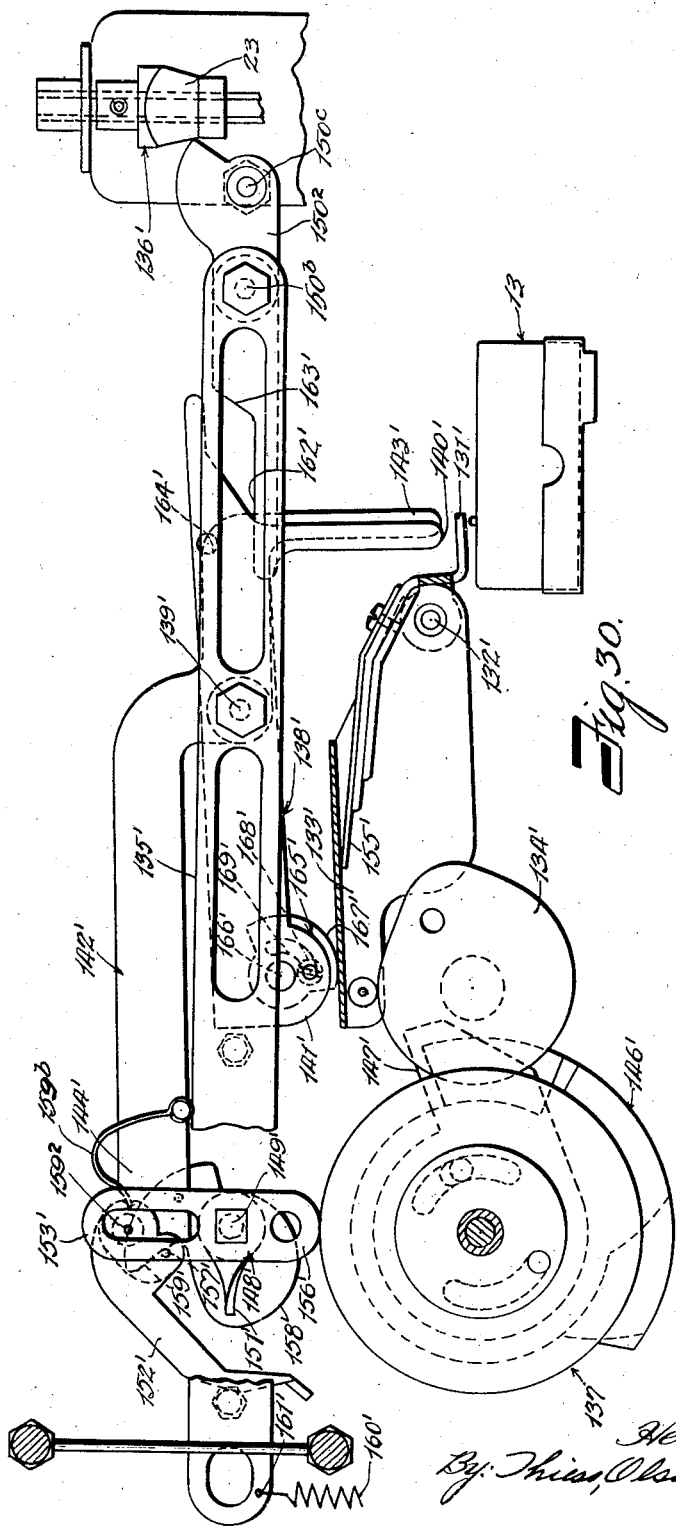
Fig. 30 is a view similar to Fig. 25, showing the parts in still another position.

In Fig. 30 the cam follower is shown turned 90 degrees counterclockwise from the position shown in Figs. 28 and 29. This provides for a continuous cycling operation controlled by outside temperature with no night-off or morning heating-up periods. The low-bar cam follower 1561 engages the circular, constant-level cam track 1451 and is effective to hold the end of the control bar in a lowered position such that the cycling lever 1381 will be effective to control the switch. The morning heating-up cam follower 1521 has been moved to ineffective position by the engagement of the cam surface 1591 with the pin 1571 on the pivoted morning heating-up cam follower 1521 to move it to the position shown in which it is beyond the reach of the sector-like morning heating-up cam. In this position of the cam selector only the cycling cam remains effective to control the switch 13 which turns the heat on and off. The follower 1521 is pivotally mounted on the lever 1421 at 1592 and is urged in a counterclockwise direction by the leaf spring 1593, the end of which engages a notch in the follower 1521. The hold-fire lever is of course effective to control the switch in all four positions of the selective cam follower described. If desired, a coil tension spring 1601 may be provided, having one end secured to the control bar at 1611, the force of which spring on the control bar will be added to the force of gravity, insuring that the cycling lever 1381 and morning heating-up lever 1421 will exert sufficient force to operate the switch when the selective cam follower is in the position shown in Figs. 28 and 29.

In order to prevent the cycling cam lever from operating the switch to turn the heat on when the outside temperature is above 65 degrees, means for preventing downward movement of the end of the cycling lever may be provided. The means shown comprises an abutment 1621 on the temperature-controlled lever 1631 engageable by a pin 1641 on the cycling lever. These parts are so designed that when the outside temperature is 65 degrees or above, the abutment will engage the pin on the cycling lever and prevent it from being depressed far enough to operate the switch.

*Control bar and control levers*

The control bar 1351 which is controlled conjointly by the temperature-controlled bellows 22 and the compound program cam 1371 is pivotally mounted at one end at 150b on the bell crank cam follower member 1502, which is pivotally mounted at 150c and the position of which is controlled by the temperature-controlled conoidal cam 23. The position of the other end of the control bar is controlled in general by the three-track cam 1371 and by the four-position selective cam follower 1481.

The time control adjustment for the cycling lever 1381 comprises an eccentric cam follower 1651 rotatably mounted at 1661 on the cycling lever and having an arcuate eccentric portion 1671 engageable with the hold-fire lever 1331. This eccentric cam 1671 may be held in the desired adjusted position by means of the clamping screw 1681 which extends through an arcuate slot 1691 in the adjustable cam follower 1671.

The length of time which the hold-fire lever 1331 will maintain the switch 13 closed and maintain the heat supply is regulated by means of an eccentric pin 1541 rotatably mounted between the sides of the hold-fire lever. By setting this eccentric pin in different positions of adjustment, the length of time which the switch will be held in closed position by the high part of the cam 1341 may be varied to give the desired length to the refueling period with each revolution of the cycling cam. The different settings of the eccentric pin give different effective radii for cooperation with the leaf spring 1551 secured to the switch actuating lever 1311. In order to enable the operator to make the proper adjustment, a sector plate 1701 is secured to the rotatable pin 1541, which plate may be secured in the desired adjustable position by the screw 171. This refueler, or hold-fire lever, is adjustable to provide from zero up to 8 minutes of operation each 72 minutes. It can be used on stoker installations for refueling or hold-fire control, to prevent the fire from going out. Such refueling would occur whenever the temperature outdoors is above 65 degrees (at which the temperature normal cycling does not occur) and occurs during the night shut-off hours. This refueling also occurs when the cam selector is in the heat-off position. This latter is for use where domestic water is heated in summer as well as in winter, with submerged heaters in order to hold the fire on a stoker or coal-fired installation. Another use for this temperature-independent, time-controlled controller is in installations where the apparatus is used to control the operation of a circulating hot water pump in a hot water heating system. This timer can function so as to operate the pump for three or four minutes each 72 minutes so as to prevent freeze-ups during the night. In heavy oil burner installations the timer has been used to produce a couple minutes of circulation of the oil in the pipe lines every hour or so when regular periods stop, such as at night, to prevent the cooling and coagulating of the oil in the lines.

*Compound cam construction*

The time-controlled rotatable compound cam (Figs. 23, 25, and 31-38, incl.) comprises, in general, three main portions—(1) a cam disc or track 1451 of constant radius, with which either the heat-on cam follower 1561 or the heat-off cam follower 1531 may be brought into operative relation; (2) an extensible cam track 1461 for cooperation with the day-on and night-off cam follower 1521 comprising three discs 172, 173, and 174 (Figs. 31, 32, and 33), each having an adjustable sector portion for night operation, and (3) the adjustable track 1471 comprising two adjustable sector portions 175 and 176 (Figs. 34 and 35) for cooperation with the morning heating-up cam follower 1621.

The compound cam construction comprises a plurality of cam sections and spacer members, rotatable together with the time-controlled driving gear 177 on a sleeve 178 which is rotatable on a stud shaft 179 secured to the back plate 180 of the apparatus. For holding the sleeve 178 in position on the stud shaft 179, a screw 181 is threaded into the end of the stud shaft, the head of the screw engaging the end of the sleeve 178. The clock driven gear 177 which drives the compound cam is directly connected with the constant level cam 1451 and with the three sections of the night-off cam 1461 by means of a pin 182 secured to the gear 177 extending through registering openings in the spacer disc 183, constant level cam 1451 and spacer disc 184, and through a hole 185 in the rear section 172 of the night-off cam, a quadrantal slot 186 in the intermediate section 173 of the night-off cam, and a semicircular slot 187 in the front section 174 of the night-off cam. The two sections 175 and 176 of the morning heating-up cam 1471 are connected to be driven from the front section 174 of the night-off cam by means of a spacer drive disc 188 mounted on the sleeve 178 and carrying a transversely extending pin 189, the outer end of which extends through the arcuate slot 190 in the rear section 175 of the morning heating-up cam and into the hole 191 in the front section 176 of the heating-up cam and the rear end of which extends through the hole 192 in the front night-off cam 174, the intermediate night-off cam 173 being provided with a quadrantal slot 193 into which the end of the pin 189 extends to enable relative movement between the intermediate section of the night-off cam and the front section of the night-off cam.

The cam tracks 1451, 1461, and 1471 are held in place by means of a nut 194 threaded on the end of the sleeve 178, suitable spacer discs 195 and a clock dial 196 being mounted on the sleeve 178 between the nut 194 and the cam track 1471.

*Temperature control of control bar*

The temperature-controlled mechanism which controls the position of the conoidal cam and its follower comprises the thermostatic expansible bellows 22, an inverted cup member 197 (Fig. 24) into which the upper end of this bellows 22 extends, a bracket 198, secured to the back plate 180 for suporting the lower end of the bellows, a coil compression spring 199 surrounding the cup-like member 197 and bearing downwardly on the lower flange 200 of the cup, a rod or shaft 201 to which the conoidal cam 23 is secured, having its lower end extending through an opening in the cup and engaging the temperature-controlled bellows 22, a shoulder 202 secured to the lower end of the rod 201 on which the inwardly-extending flange or shoulder of the cup 197 bears, a bracket 203 in which the cam shaft 201 is rotatably and slidably mounted, a spring-centering washer 204 surrounding this shaft against which the upper end of the spring 199 bears, and a handle member or heat adjustment dial 205 for rotating the cam shaft 201 having a non-circular opening through which the cam shaft extends, the shaft having one side flattened so that it is noncircular in cross section to conform to the noncircular opening in the rotatable cam shaft actuating handle. The rotatable handle is provided with a temperature scale 206 for cooperation with a fixed pointer 207. This cam adjustment dial may be set so that the pointer 207 will be opposite the lowest temperature which may ordinarily be expected in the location in which the apparatus is installed.

To facilitate the setting of the cam adjustment dial, it is provided with an adjustable indicator knob 208 which can be adjusted rotarily with respect to the dial 205 and held in adjusted position by the set screw 209. This cap 208 may be set so thoat the indicia "normal" is opposite the lowest expected temperature on the dial, and the dial is then turned until the indicia "normal" is opposite the pointer 207. For example, in a heating system designed to heat a building to 70 degrees when it is zero outside, the "normal" of the top section of the heat adjustment dial should be set over the "zero" marking on the bottom section of the heat adjustment dial. If the system is designed for a 10 or 20 above zero condition, or 10, 20 or 30 degrees below zero condition, the setting should be made with the "normal" over the design temperature marking. While the architect or engineer may design a heating system to heat the building to 70 degrees at zero degrees outdoors, sometimes a little too much radiation may be installed, and so, if the building is continuously being overheated, the normal of the upper section of the heat adjustment dial may be moved down towards the −10 degree setting by simply loosening the set-screw again. If, on the other hand, too little radiation has been installed, it may be necessary to move the normal to the right so that it is set over the +10 degree position. By this adjustment, the swing or the range of heating is changed so that in the −10 degree position, continuous heating will not occur until the temperature outside approaches 10 degrees below zero, whereas in the +10 degree position, just as soon as the temperature approaches 10 degrees above zero, the burner will be operating continuously, and in this latter position the length of the heating period will vary from continuous operation at +10 degrees down to the minimum length of operation at 65 degrees.

The drive from the synchronous motor to the gear 177, which drives the compound cam, comprises a pinion 210 driven by the synchronous motor, a gear 211 meshing with this pinion, and a pinion 212 rotatable with this gear 211 and meshing with the gear 177. The gear 211 drives the cycling cam 1341 through a pinion 213 meshing with the gear 211, a gear 214 rotatable with the pinion 213, and a pinion 215 meshing with this gear and rotatable with the cycling cam.

For indicating the various adjusted positions of the control knob 1501, a dial 216 may be secured to the control bar 1351 by means of screws 217, which dial has indicia 218 cooperating with the pointer on the control knob. A hinged cover 219 may be provided for the apparatus so that when the cover is closed, all of the apparatus will be housed between the backing plate 180 and the cover.

In assembling the compound cam and associated parts, the cycling cam 1341 may be so set with respect to the night-off cam rise 220 that the rise on the cycling cam may, under certain temperature-controlled conditions, disengage its follower to turn the heat off before the heat would be turned off by the night-off cam rise 220 on the night-off cam. This might occur if the outside temperature were relatively high, causing a relatively early disengagement of the cycling cam with respect to its follower.

Figures 23, 24:
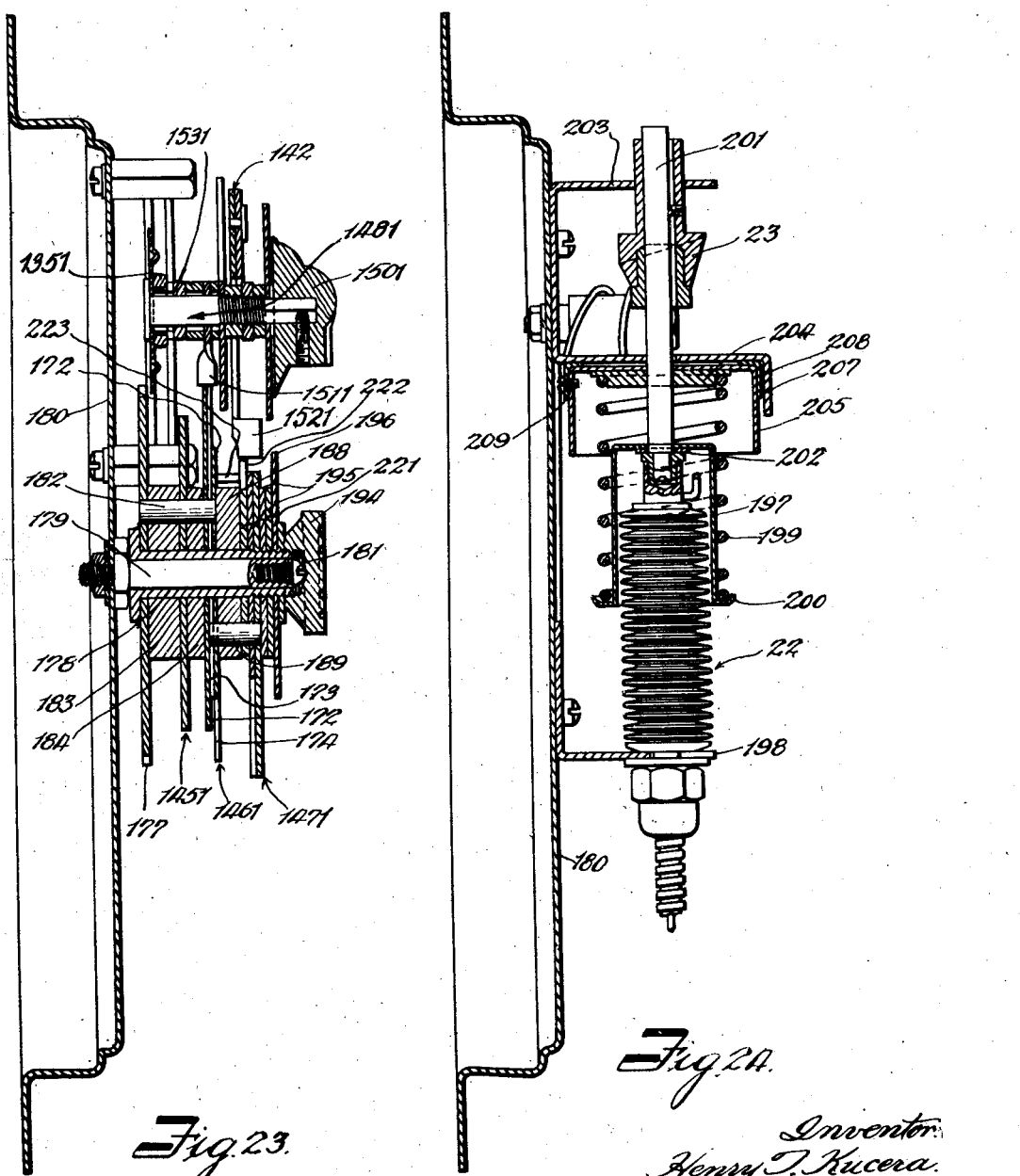
Fig. 23 is a section on the line 23—23 of Fig. 22.
Fig. 24 is a section on the line 24—24 of Fig. 22.

Also, if desired, the spacer disc 221 may be provided with a cam portion 222 (Figs. 22 and 23) for cooperation with the cam follower 1521 to turn the heat on at a time controlled by outside temperature just prior to the turning off of the heat by the night-off cam rise 220. The cam disc 221 may be secured to the night-off cam disc 172 in any suitable manner as by a number of pins 223 (Fig. 23).

Further modifications will be apparent to those skilled in the art and it is desired, therefore, that the invention be limited only by the scope of the appended claims.

Having thus described my invention, what I claim and desire to secure by Letters Patent is:

1. Heat transfer control means comprising a time-controlled rotary cam, a follower lever cooperating with said cam, a yieldable switch actuator carried by said follower lever, a switch, a switch-carrying lever on which said switch is mounted for movement toward and from said switch actuator, and temperature-controlled means for controlling the movement of said switch-carrying lever.

2. Heat transfer control apparatus comprising a time-controlled rotary cam, a movable switch operator controlled by said cam, a snap switch mounted for movement toward and from said switch operator and having a movable contact spring-biased on both sides of a dead center position, and temperature-controlled means for controlling the movement of said switch toward and from said operator to vary the time at which the switch is operated.

3. Heat transfer control apparatus comprising a time-controlled rotary cam having a plurality of rise portions, each followed by a drop, a movable switch operator controlled by said cam, a switch mounted for movement toward and from said switch operator, and temperature-controlled means for controlling the movement of said switch to vary the time at which the switch is operated.

4. Heat transfer control apparatus comprising a time-controlled rotary cam having a rise portion terminating in an abrupt drop, a movable switch operator controlled by said cam, a switch mounted for movement toward and from said switch operator, and temperature-controlled means for controlling the movement of said switch to vary the time at which the switch is operated.

5. Heat transfer control apparatus comprising a time-controlled rotary cam, a movable switch operator controlled by said cam, a snap switch mounted for movement toward and from said switch operator and having a movable contact spring-biased on both sides of a dead center position, and temperature-controlled means for controlling the movement of said switch toward and from said operator to vary the time at which the switch is operated, the total rise of said gradual rise portion being several times greater than that necessary to effect the operation of the switch.

6. Heat transfer control apparatus comprising a time-controlled rotary cam, a movable switch operator controlled by said cam, a snap switch mounted for movement toward and from said switch operator and having a movable contact spring-biased on both sides of a dead center position, and temperature-controlled means for controlling the movement of said switch toward and from said operator to vary the time at which the switch is operated, the total rise of said gradual rise portion being several times greater than that necessary to effect the operation of the switch, the transmission betwen the follower and switch comprising a yielding lost motion transmission whereby the follower may continue to rise after the operation of the switch.

7. Heat transfer control apparatus comprising a plurality of time-controlled coaxial rotary cams, a plurality of movable switch operators, one controlled by each of said cams, movable switch means mounted for movement toward and from said switch operators, and temperature-controlled means for controlling the movement of said switch means to vary the time at which the switch means are operated.

8. Heat transfer control apparatus comprising a time-controlled rotary cam having a gradual continuous rise portion, a movable switch operator controlled by said cam, a snap switch mounted for movement toward and from said switch operator having contacts brought into engagement by the gradual continuous rise portion of the cam, and temperature-controlled means for controlling the movement of said switch toward and from said operator to vary the time at which the switch is operated.

9. Heat transfer control apparatus comprising a time-controlled rotary cam having a gradual continuous rise portion, a movable switch operator controlled by said cam, a switch mounted for movement toward and from said switch actuator having a movable contact and two contacts with which said movable contact is alternately engageable, and temperature-controlled means for controlling the movement of said switch toward and from said operator to vary the time at which the switch is operated.

10. Heat transfer control apparatus comprising a time-controlled rotary cam having a gradual continuous rise portion, a movable switch operator controlled by said cam, a switch spring-biased on both sides of a dead center position mounted for movement toward and from said switch actuator having a movable contact and two contacts with which said movable contact is alternately engageable, and temperature-controlled means for controlling the movement of said switch toward and from said operator to vary the time at which the switch is operated.

11. Heat transfer control apparatus comprising a time-controlled rotary cam having a gradual continuous rise portion, a movable switch operator controlled by said cam, a switch mounted for movement toward and from said switch actuator having a movable contact and two contacts with which said movable contact is alternately engageable, and temperature-controlled means for controlling the movement of said switch toward and from said operator to vary the time at which the switch is operated, the total rise of said gradual rise portion being several times greater than that necessary to effect the operation of the switch.

12. Heat transfer control apparatus comprising a time-controlled rotary cam having a gradual continuous rise portion, a movable switch operator controlled by said cam, a switch mounted for movement toward and from said switch actuator having a movable contact and two contacts with which said movable contact is alternately engageable, and temperature-controlled means for controlling the movement of said switch toward and from said operator to vary the time at which the switch is operated, the total rise of said gradual rise portion being several times greater than that necessary to effect the operation of the switch, the transmission between the follower and switch comprising a yielding lost motion transmission whereby the follower may continue to rise after the operation of the switch.

13. Heat transfer control apparatus comprising a temperature-controlled rectilinearly movable plunger, a cam movable rectilinearly therewith and also rotatable about an axis extending longitudinally of the plunger, a follower actuated by rotational and rectilinear movement of said cam, said cam having different meridional contours brought into engagement with the follower by the rotation of the cam, manually adjustable and settable means for adjusting the cam rotarily and for holding the cam against rotation during its rectilinear temperature-controlled movement, and manually settable stop means adjustable to different stop positions for determining the range of adjustment of said adjustable holding means.

14. Heat transfer control apparatus comprising a temperature-controlled rectilinearly movable plunger, a cam movable rectilinearly therewith and also rotatable about an axis extending longitudinally of the plunger, a follower actuated by rotational and rectilinear movement of said cam, said cam having different meridional contours brought into engagement with the follower by the rotation of the cam, manually adjustable and settable means for adjusting the cam rotarily and for holding the cam against rotation during its rectilinear temperature-controlled movement, said follower comprising a slide mounted for movement transversely of the axis of the cam, a lever actuated by said slide, and a circuit-controlling device mounted on said lever.

15. A heat transfer control apparatus comprising a plurality of time-controlled rotatable cams, each having a gradual continuous rise portion, a plurality of movable switch operators, one controlled by each cam, switch means mounted for movement toward and from said switch operators, and temperature-controlled means for controlling the movement of said switch means toward and from said operators to vary the time at which the switch means are operated.

16. A heat transfer control apparatus comprising two time-controlled rotatable cams, a first one of said cams having a gradual continuous rise portion, a movable switch operator controlled by said first cam, switch means mounted for movement toward and from said switch operator, temperature-controlled means for controlling the movement of said switch means toward and from said operator to vary the time at which the switch is operated, and means controlled by the other of said cams for moving said switch means beyond the control of said switch operator.

17. A heat transfer control apparatus comprising three time-controlled rotatable cams, two of said cams each having a gradual continuous rise portion, two movable switch operators controlled by said two cams, respectively, switch means mounted for movement toward and from said switch operators, temperature-controlled means for controlling the movement of said switch toward and from said operators to vary the time at which said switch means are operated, and switch-moving means controlled by the third cam for moving the switch beyond control of said switch operator.

18. Heat transfer control apparatus comprising a time-controlled rotary cam having a gradual continuous rise portion, a movable switch operator controlled by said cam, a snap switch mounted for movement toward and from said switch operator having contacts brought into engagement by the gradual continuous rise portion of the cam, and temperature-controlled means for controlling the movement of said switch toward and from said operator to vary the time at which the switch is operated, the total rise of said gradual rise portion being several times greater than that necessary to effect the operation of the switch.

19. Heat transfer control apparatus comprising a time-controlled rotary cam having a gradual continuous rise portion, a movable switch operator controlled by said cam, a snap switch mounted for movement toward and from said switch operator having contacts brought into engagement by the gradual continuous rise portion of the cam, and temperature-controlled means for controlling the movement of said switch toward and from said operator to vary the time at which the switch is operated, the total rise of said gradual rise portion being several times greater than that necessary to effect the operation of the switch, the transmission between the follower and switch comprising a yielding lost motion transmission whereby the follower may continue to rise after the operation of the switch.

20. Heat transfer control apparatus comprising a time-controlled rotatable cam having a gradual continuous rise portion, a movable switch operator controlled by said cam, switch means mounted for movement toward and from said operator to vary the time at which the switch is operated, and an actuator for moving said switch means beyond the control of said switch operator.

21. Heat transfer control apparatus comprising a time-controlled rotatable cam having a gradual continuous rise portion, a movable switch operator controlled by said cam, switch means mounted for movement toward and from said operator to vary the time at which the switch is operated, and a manually adjustable actuator for moving said switch means beyond the control of said switch operator.

22. Heat transfer control apparatus comprising a time-controlled rotatable cam having a gradual continuous rise portion, a movable switch operator controlled by said cam, switch means mounted for movement toward and from said operator to vary the time at which the switch is operated, and a manually adjustable actuator for operating said switch means and eliminating cam control of the switch means.

23. A heat transfer control apparatus comprising a plurality of time-controlled rotatable cams, each having a gradual continuous rise portion, a plurality of movable switch operators, one controlled by each cam, switch means mounted for movement toward and from said switch operators, temperature-controlled means for controlling the movement of said switch means toward and from said operators to vary the time at which the switch means are operated, and a manually adjustable operator for preventing one of said switch operators from operating the switch means.

24. A heat transfer control apparatus comprising a plurality of time-controlled rotatable cams, each having a gradual continuous rise portion, a plurality of movable switch operators, one controlled by each cam, switch means mounted for movement toward and from said switch operators, and temperature-controlled means for controlling the movement of said switch means toward and from said operators to vary the time at which the switch means are operated, one of said operators comprising a cam controlled plunger and another of said operators comprising a cam controlled plunger sleeve through which said plunger extends.

25. A heat transfer control apparatus comprising a plurality of time-controlled rotatable cams, each having a gradual continuous rise portion, a plurality of movable switch operators, one controlled by each cam, switch means mounted for movement toward and from said switch operators, temperature-controlled means for controlling the movement of said switch means toward and from said operators to vary the time at which the switch means are operated, one of said operators comprising a cam controlled plunger and another of said operators comprising a cam controlled plunger sleeve through which said plunger extends, and a manually adjustable actuator for blocking the movement of said plunger sleeve to prevent it from operating the switch means.

26. Heat transfer control apparatus comprising time-controlled rotary cam means having a plurality of gradual continuous rise portions, each followed by a drop, two movable switch operators controlled by said cam means, a switch mounted for movement toward and from one of said switch operators, a stationary switch controlled by the other switch operator, and temperature-controlled means for controlling the movement of said movable switch operator to vary the time at which said movable switch is operated.

27. Heat control apparatus comprising a control bar, each end of said bar being mounted for movement throughout a range, means controlled by temperature for determining the position of one end of the bar, rotatable compound cam means for controlling the movement of the other end of the bar, a rotatable compound cam selector and follower mounted on said other end of the bar cooperating with said compound cam, chronometric means for controlling the movement of said compound cam, a two-position snap switch biased to one position, a lever mounted on a fixed pivot for operating said switch, a second lever coaxial with said first lever and having a lost-motion engagement therewith, a chronometric cam for periodically operating said second lever, adjustable means for adjusting the extent of said lost motion, a third lever mounted on said control bar engageable with said first lever for operating the switch and having a lost-motion engagement with respect to said second lever, means controlled by outside temperature for preventing said second lever from engaging said first lever on a predetermined rise of temperature, said compound cam comprising a full-circle rotatable cam contour, a first rotatable rise and dwell cam contour, and a second rotatable rise and dwell cam contour, said rotatable compound cam follower comprising two alternately operative follower portions at different radial distances from the axis of said cam follower and both rotatable with said cam follower, both controlled by said full-circle cam contour and so designed that when one of said follower portions is operative the control bar will be lowered so that the switch will be closed and so that when the other is operative the control bar will be raised so that the switch will be open, said compound cam follower also comprising a third follower portion rotatable with said cam follower cooperating with said first rise and dwell cam contour, and a fourth follower portion nonrotatable with said rotatable cam follower engageable by said second rise and dwell cam contour in three positions of said rotatable compound cam follower and non-engageable by said second rise and dwell cam contour in a fourth position of said rotatable compound cam follower, and a fourth lever mounted on said control bar for engaging said first lever, on which fourth lever said fourth follower portion is mounted.

28. Heat control apparatus comprising a control bar, each end of said bar being mounted for movement throughout a range, means controlled by temperature for determining the position of one end of the bar, rotatable compound cam means for controlling the movement of the other end of the bar, a rotatable compound cam follower mounted on said other end of the bar cooperating with said compound cam, chronometric means for controlling the movement of said compound cam, a switch for controlling the transfer of heat, said compound cam comprising a full-circle rotatable cam contour, a first rotatable rise and dwell cam contour, and a second rotatable rise and dwell cam contour, said rotatable compound cam follower comprising two alternately operative follower portions at different radial distances from the axis of said cam follower and both rotatable with said cam follower, both controlled by said full-circle cam contour and so designed that when one of said follower portions is operative the control bar will be lowered so that the switch will be closed and so that when the other is operative the control bar will be raised so that the switch will be open.

29. Heat control apparatus comprising a control bar, each end of said bar being mounted for movement throughout a range, means controlled by outside temperature for determining the position of one end of the bar, cam means for controlling the movement of the other end of the bar, a cam follower mounted on said other end of the bar cooperating with said cam, chronometric means for controlling the movement of said cam, a switch for controlling the transfer of heat, a lever mounted on said bar for operating said switch, and a chronometric cam for periodically operating said lever.

30. Heat control apparatus comprising a one-way biased snap switch having a short-motion movable contact member movable past a dead center, means for controlling the movement of said movable contact comprising a time-controlled cam, a cam follower periodically actuated by said cam, and transmission between said follower and contact, the cam-controlled movement of said follower in one direction being several times greater than that necessary to close the switch and the cam-controlled movement in the other direction being several times greater than that necessary to open the switch, transmission between said cam and switch including a lost-motion device whereby the cam causes the switch to remain in one position during a substantial movement of the cam, and temperature-controlled means for modifying the effect of the cam on the switch to vary the length of time the switch remains in said one position.

31. Heat control apparatus comprising a one-way biased snap switch having a short-motion movable contact member movable past a dead center, means for controlling the movement of said movable contact comprising a time-controlled cam, a cam follower periodically actuated by said cam, and transmission between said follower and contact, the cam-controlled movement of said follower in one direction being several times greater than that necessary to close the switch and the cam-controlled movement in the other direction being several times greater than that necessary to open the switch, transmission between said cam and switch including a lost-motion device whereby the cam causes the switch to remain in one position during a substantial movement of the cam, and temperature-controlled means for modifying the effect of the cam on the switch to vary the length of time the switch remains in said one position comprising means for varying the position of at least a part of the transmission between the cam and switch.

32. Heat control apparatus comprising a snap switch having a short-motion movable contact member movable with a snap action past a dead center to change the condition of heat transfer apparatus, means for controlling the movement of said movable contact comprising a time-controlled cam and a cam follower periodically actuated by said cam, the cam-controlled movement of said follower in one direction being several times greater than that necessary to effect the snap action of the switch, and temperature-controlled means for modifying the effect of the cam on the switch to vary chronologically the instant of snap action of the switch.

33. Heat control apparatus comprising a one-way biased snap switch having a short-motion movable contact member movable with a snap action past a dead center to change the condition of heat transfer apparatus, means for controlling the movement of said movable contact comprising a time-controlled cam and a cam follower periodically actuated by said cam, the cam-controlled movement of said follower in one direction being several times greater than that necessary to effect the snap action of the switch, and temperature-controlled means for modifying the effect of the cam on the switch to vary chronologically the instant of snap action of the switch.

34. Heat control apparatus comprising a snap switch having a short-motion movable contact member movable with a snap action past a dead center to change the condition of heat transfer apparatus, means for controlling the movement of said movable contact comprising a time-controlled cam, a cam follower periodically actuated by said cam, and transmission between said follower and contact, the cam-controlled movement of said follower in one direction being several times greater than that necessary to effect the snap action of the switch, the transmission between said cam and switch including a lost-motion device whereby the follower can continue its movement after the snap action of the switch, and temperature-controlled means for modifying the effect of the cam on the switch to vary chronologically the instant of snap action of the switch.

35. Heat control apparatus comprising a snap switch having a short-motion movable contact member movable with a snap action past a dead center to change the condition of heat transfer apparatus, means for controlling the movement of said movable contact comprising a time-controlled cam, a cam follower periodically actuated by said cam, and transmission between said follower and contact, the cam-controlled movement of said follower in one direction being several times greater than that necessary to effect the snap action of the switch, the transmission between said cam and switch including a lost-motion device whereby the follower can continue its movement after the snap action of the switch, and temperature-controlled means for modifying the effect of the cam on the switch to vary chronologically the instant of snap action of the switch comprising means for varying the position of at least a part of the transmission between the cam and switch.

36. Heat control apparatus comprising a snap switch having a short-motion movable contact member movable with a snap action past a dead center to change the condition of heat transfer apparatus, means for controlling the movement of said movable contact comprising time-controlled cam means and a plurality of followers controlled by said cam means and periodically actuated thereby, the cam-controlled movement of said followers in one direction being several times greater than that necessary to effect the snap action of the switch, and temperature-controlled means for modifying the effect of the cam on the switch to vary chronologically the instant of snap action of the switch.

37. Heat control apparatus comprising a snap switch having a short-motion movable contact member movable with a snap action past a dead center to change the condition of heat transfer apparatus, means for controlling the movement of said movable contact comprising time-controlled cam means and cam follower means periodically actuated by said cam means to effect snap action of said switch, the cam-controlled movement of said follower means in one direction being several times greater than that necessary to effect the snap action of the switch, and temperature-controlled means for modifying the effect of the cam means on the switch to vary chronologically the instant of snap action of the switch means, said cam follower means being manually adjustable to a plurality of different positions to change the action of the cam means on the switch.

38. Heat control apparatus comprising a snap switch having a short-motion movable contact member movable with a snap action past a dead center to change the condition of heat transfer apparatus, means for controlling the movement of said movable contact comprising time-controlled cam means and cam follower means periodically actuated by said cam means to effect snap action of said switch, the cam-controlled movement of said follower means in one direction being several times greater than that necessary to effect the snap action of the switch, temperature-controlled means for modifying the effect of the cam means on the switch to vary chronologically the instant of snap action of the switch, said cam means comprising time-controlled means periodically effecting the action of the switch to effect periodic heat transfer and comprising also time-controlled means for periodically preventing said periodic action of the switch.

39. Heat control apparatus comprising a snap switch having a short-motion movable contact member movable with a snap action past a dead center to change the condition of heat transfer apparatus, means for controlling the movement of said movable contact comprising a time-controlled cam and a cam follower periodically actuated by said cam, the cam-controlled movement of said follower in one direction being several times greater than that necessary to effect the snap action of the switch, and means controlled by outside temperature for modifying the effect of the cam on the switch to vary chronologically the instant of snap action of the switch.

40. Heat control apparatus comprising a control bar, each end of said bar being mounted for movement throughout a range, temperature controlled means for determining the position of one end of the bar, cam means for controlling the movement of the other end of the bar, a rotatable compound cam follower mounted on said other end of the bar cooperating with said cam and having a plurality of selectively operable follower portions for cooperation with said cam means, chronometric means for controlling the movement of said cam, a switch for controlling the transfer of heat, a lever mounted on said bar for operating said switch, and a chronometric cam for periodically operating said lever.

HENRY T. KUCERA.